US011051999B2

(12) United States Patent
Hayes et al.

(10) Patent No.: US 11,051,999 B2
(45) Date of Patent: Jul. 6, 2021

(54) PATIENT SUPPORT APPARATUSES WITH NAVIGATION AND GUIDANCE SYSTEMS

(71) Applicant: Stryker Corporation, Kalamazoo, MI (US)

(72) Inventors: Michael Joseph Hayes, Kalamazoo, MI (US); Krishna Sandeep Bhimavarapu, Kalamazoo, MI (US); Daniel Vincent Brosnan, Kalamazoo, MI (US); Aaron Douglas Furman, Kalamazoo, MI (US); Jonathan David Campbell, Scotts, MI (US); Thomas Alan Puvogel, Kalamazoo, MI (US); James K. Galer, Byron Center, MI (US); Jason A. Vanderplas, Kalamazoo, MI (US)

(73) Assignee: Stryker Corporation, Kalamazoo, MI (US)

(*) Notice: Subject to any disclaimer, the term of this patent is extended or adjusted under 35 U.S.C. 154(b) by 137 days.

(21) Appl. No.: 16/549,541

(22) Filed: Aug. 23, 2019

(65) Prior Publication Data
US 2019/0374411 A1 Dec. 12, 2019

Related U.S. Application Data

(63) Continuation of application No. 15/185,067, filed on Jun. 17, 2016, now Pat. No. 10,406,045.
(Continued)

(51) Int. Cl.
*A61G 1/02* (2006.01)
*A61G 7/015* (2006.01)
(Continued)

(52) U.S. Cl.
CPC .......... *A61G 1/0281* (2013.01); *A61G 1/013* (2013.01); *A61G 1/02* (2013.01); *A61G 1/0275* (2013.01); *A61G 7/015* (2013.01); *A61G 7/018* (2013.01); *A61G 7/05* (2013.01); *A61G 7/0528* (2016.11); *B60K 31/0008* (2013.01);
(Continued)

(58) Field of Classification Search
CPC ...... A61G 1/0281; A61G 1/0275; A61G 1/02; A61G 7/00; A61G 7/015; A61G 7/018; B60K 31/00; B60K 31/0008
See application file for complete search history.

(56) References Cited

U.S. PATENT DOCUMENTS

| 10,758,162 B2* | 9/2020 | Shen | ................ | A61B 5/1115 |
| 2016/0256080 A1* | 9/2016 | Shen | ................ | A61B 5/6891 |

* cited by examiner

*Primary Examiner* — Frederick C Conley
(74) *Attorney, Agent, or Firm* — Warner Norcross + Judd LLP

(57) ABSTRACT

Patient support apparatuses, such as beds, cots, stretchers, recliners, or the like, include control systems with one or more image, radar, and/or laser sensors to detect objects and determine if a likelihood of collision exists. If so, the control system controls the speed and steering of the patient support apparatus in order to reduce the likelihood of collision. The control system may be adapted to autonomously drive the patient support apparatus, to transmit a message to a remote device indicating whether it is occupied by a patient or not, and/or to transmit its route to the remote device. The remote device may determine an estimate of a time of arrival of the patient support apparatus at a particular destination and/or determine a distance of the patient support apparatus from the particular destination.

20 Claims, 10 Drawing Sheets

Related U.S. Application Data

(60) Provisional application No. 62/182,911, filed on Jun. 22, 2015.

(51) Int. Cl.
  *A61G 1/013* (2006.01)
  *A61G 7/05* (2006.01)
  *A61G 7/018* (2006.01)
  *G05D 1/02* (2020.01)
  *B60K 31/00* (2006.01)
  *G01C 21/20* (2006.01)

(52) U.S. Cl.
  CPC ......... *G01C 21/206* (2013.01); *G05D 1/0223* (2013.01); *G05D 1/0248* (2013.01); *G05D 1/0289* (2013.01); *A61G 2203/22* (2013.01); *G05D 1/024* (2013.01); *G05D 1/0257* (2013.01); *G05D 2201/0206* (2013.01); *Y10S 901/01* (2013.01)

PATIENT SUPPORT APPARATUSES WITH NAVIGATION AND GUIDANCE SYSTEMS

CROSS-REFERENCE TO RELATED APPLICATIONS

This application claims priority to U.S. patent application Ser. No. 15/185,067 filed Jun. 17, 2016, by inventors Michael Hayes et al. and entitled PATIENT SUPPORT APPARATUSES WITH NAVIGATION AND GUIDANCE SYSTEMS, which in turn claims priority to U.S. provisional patent application Ser. No. 62/182,911 filed Jun. 22, 2015, by inventors Michael Hayes et al. and entitled PATIENT SUPPORT APPARATUSES WITH NAVIGATION AND GUIDANCE SYSTEMS, the complete disclosures of which are both incorporated herein by reference.

BACKGROUND

The present disclosure relates to patient care devices, such as patient thermal temperature management systems, as well as patient support apparatuses, such as beds, cots, stretchers, recliners, and the like.

Patient support apparatuses are often used to transport individuals within a healthcare facility, such as a hospital, from one location to another. In some instances, the patient support apparatuses include built-in propulsion systems that drive one or more wheels on the patient support apparatus, thereby reducing the effort a caregiver would otherwise have to exert in pushing the patient support apparatus from one location to another. In other instances, the caregiver is forced to supply all of the motive force for moving the patient support apparatus from one location to another.

SUMMARY

According to various embodiments of the present disclosure, patient support apparatuses are provided that include built-in navigation and/or guidance systems. Such built-in navigation and/or guidance systems enable the patient support apparatuses to perform one or more of the following functions: autonomously drive themselves to destinations; avoid collisions with obstacles; determine their location within a facility in substantially real time (including during transit); communicate with a centralized tracking and scheduling system; automatically recharge their batteries; detect landmarks and/or recognize features within a particular healthcare facility that enable the patient support apparatuses to determine their location; and/or transport patients in a more timely and efficient manner. Other functions may also be performed, either in addition to or in lieu of these functions, by different embodiments of the patient support apparatuses disclosed herein.

According to one embodiment, a patient support apparatus is provided that includes a frame, wheels, a motor, an actuator, a support surface, an image sensor, and a control system. The motor drives at least one of the wheels and the actuator steers the patient support apparatus. The support surface is supported by the frame and adapted to support a patient thereon. The image sensor captures images of an area within a field of view of the image sensor. The control system communicates with the image sensor and analyzes the images to detect objects within the field of view. The control system also identifies at least some of the detected objects, determines a relative velocity of the detected objects to the patient support apparatus, uses the relative velocity to determine if any of the detected objects have a likelihood of collision with the patient support apparatus that exceeds a threshold, and controls the motor and the actuator in order to reduce the likelihood of collision below the threshold.

In other embodiments, the control system is adapted to automatically identify walls and floors in the images and to use the identification of the walls and floors to autonomously drive the patient support apparatus.

The control system may also control the actuator in order to reduce the likelihood of collision by steering away from the one or more objects.

In some embodiments, a user interface is included that allows a user to input a desired destination of the patient support apparatus within a healthcare facility. The control system then automatically controls the motor and the actuator such that the patient support apparatus arrives at the desired destination.

The patient support apparatus may also include an orientation sensor for determining an orientation of the patient support apparatus within a frame of reference; a speed sensor for determining a speed of the patient support apparatus; and a memory having map of a healthcare facility in which the patient support apparatus is positioned. The memory includes data sufficient to correlate the frame of reference with the map. In some embodiments, the image sensor is adapted to detect landmarks within the healthcare facility and the control system utilizes the detected landmarks to autonomously drive the patient support apparatus to a destination. The landmarks may include human readable signs positioned within the healthcare facility, such as signs indicating room numbers. Other landmarks may also be used.

In some embodiments, the control system analyzes the images to detect objects by applying one or more of the following to the images: Sobel filtering, box blurring, Gaussian blurring, convolutional filtering, and median filtering. The control system may also include a memory having object descriptors stored therein. When so included, the control system analyzes the images to determine whether objects corresponding to the object descriptors are present in the images. In some cases, the object descriptors include object descriptors for doors.

An exit detection system may be included with the patient support apparatus that detects if the patient supported on the support surface may be about to exit the patient support apparatus. When included, the control system communicates with the exit detection system and reduces a speed of the motor if the exit detection system detects that the patient supported on the support surface may be about to exit the patient support apparatus.

In some embodiments, the patient support apparatus includes a memory having dimensions of the patient support apparatus stored therein. When so included, the control system utilizes the dimensions in determining the likelihood of collision with any of the detected objects.

The patient support apparatus, in some embodiments, includes a second image sensor positioned at the patient support apparatus at a known distance from—and a known orientation with respect to—the image sensor. When equipped with a second image sensor, the control system determines distances between the patient support apparatus and the detected objects by analyzing the images from both of the image sensors, as well as by utilizing the known distance between, and the known relative orientation of, the two image sensors.

In some embodiments, the actuator for steering the patient support apparatus is a second motor for driving a second one of the wheels at a different speed than the first one of the wheels.

The patient support apparatus may also include a wireless transceiver adapted to receive a wireless message that includes a desired destination of the patient support apparatus within a healthcare facility, wherein the control system is adapted to automatically control the motor and the actuator such that the patient support apparatus arrives at the desired destination. In some instances, the wireless transceiver receives a route and the control system controls the motor and the actuator such that the patient support apparatus follows the route to the desired destination.

According to another embodiment, a patient support apparatus is provided that includes a frame, wheels, a motor, an actuator, a support surface, a radar transmitter, a radar sensor, and a control system. The motor drives at least one of the wheels and the actuator steers the patient support apparatus. The radar transmitter is adapted to emit radar transmissions and the radar sensor is adapted to detect at least some of the reflections of the transmissions from the radar transmitter. The control system analyzes the reflections to detect objects, to determine a relative velocity of the detected objects to the patient support apparatus, to use the relative velocity to determine if any of the detected objects have a likelihood of collision with the patient support apparatus that exceeds a threshold, and to control the motor and the actuator in order to reduce the likelihood of collision below the threshold.

In some embodiments, an image sensor is included in addition to the radar transmitter and radar sensor. The image sensor detects landmarks within the healthcare facility and the control system utilizes the detected landmarks to autonomously drive the patient support apparatus to a destination. The landmarks may include human readable signs positioned within the healthcare facility, such as, but not limited to, room numbers.

According to another embodiment, a patient support apparatus is provided that includes a frame, wheels, a motor, an actuator, a support surface, an image sensor, and a control system. The motor drives at least one of the wheels and the actuator steers the patient support apparatus. The image sensor captures images of an area within a field of view of the image sensor, and the control system analyzes the images to detect landmarks within a healthcare facility. The control system also utilizes the detected landmarks to autonomously drive the patient support apparatus to a destination within the healthcare facility.

In other embodiments, the patient support apparatus also includes an orientation sensor, a speed sensor, and a memory. The memory includes a map of the landmarks within the healthcare facility, as well as data sufficient to correlate the frame of reference with the map. The memory may also include landmark descriptors stored therein that the control system uses when analyzing the images to detect the landmarks. The landmark descriptors include, in some embodiments, landmark descriptors for colored lines running along a floor or on walls.

In some embodiments, the control system analyzes the images to detect the landmarks by applying one or more of the following to the images: Sobel filtering, box blurring, Gaussian blurring, convolutional filtering, and median filtering.

Some of the embodiments of the patient support apparatus include a laser transmitter and a laser sensor. The control system is in communication with the laser sensor and analyzes reflections of the laser light transmitted from the laser transmitter. The control system detects objects using the reflection, determines a relative velocity of the detected objects to the patient support apparatus, uses the relative velocity to determine if any of the detected objects have a likelihood of collision with the patient support apparatus that exceeds a threshold, and controls the motor and the actuator in order to reduce the likelihood of collision below the threshold.

According to another embodiment, a patient support apparatus is provided that includes a frame, wheels, a support surface, a navigation system, a wireless transceiver, and a control system. The navigation system detects movement of the patient support apparatus within a healthcare facility. The wireless transceiver communicates with a remote device. The control system communicates with the navigation system and the wireless transceiver, and transmits to the remote device movement information that indicates what route was followed by the patient support apparatus in moving from a first location to a second location.

Some of the embodiments of the navigation system include an accelerometer for detecting accelerations of the patient support apparatus and a magnetometer for detecting a geographical orientation of the patient support apparatus. A wheel counting sensor may also, or alternatively, be included that detects revolutions of at least one of the wheels. Still further, the navigation system may include an altimeter adapted to detect an elevation of the patient support apparatus.

The wireless transceiver is a WiFi radio, in some embodiments, and the remote device is a server on a computer network of the healthcare facility. The control system transmits to the remote device a time when the patient support apparatus moved from the first location to the second location.

In some embodiments, the memory stores a history of the movement of the patient support apparatus.

According to another embodiment, a patient support apparatus system is provided that includes a patient support apparatus and a remote device. The patient support apparatus includes a frame, wheels, a support surface, a navigation system, a wireless transceiver, and a control system adapted to transmit both data from the navigation system and a unique identifier corresponding to the patient support apparatus. The remote device is adapted to receive the data and to determine an estimated time of arrival of the patient support apparatus at a particular destination within a healthcare facility based upon the data.

The wireless transceiver is a WiFi radio and the remote device is a server on a computer network of the healthcare facility, in some embodiments. The remote device may also transmit messages over the computer network indicating the estimated time of arrival. The messages are transmitted to a second server on the computer network that is adapted to forward the messages wirelessly to mobile electronic devices carried by personnel of the healthcare facility. The mobile electronic devices include cell phones and tablet computers.

The remote device may be adapted to determine a distance traveled by the patient support apparatus. In some embodiments, the remote device repetitively updates and records that distance in memory, and then generates an alert message when the distance exceeds a threshold.

The remote device keeps track of a current location of a plurality of patient support apparatuses, as well as an availability of the plurality of patient support apparatuses for transporting patients, in some embodiments. The remote device may determine, out of the plurality of patient support apparatuses, the closest currently available one to a selected location.

According to another embodiment, a patient support apparatus system is provided that includes a plurality of patient support apparatuses and a remote device. The patient support apparatuses each include a frame, wheels, a support surface, a navigation system, a wireless transceiver, and a control system. The control system transmits data from the navigation system and a unique identifier of the patient support apparatus to the remote device. The remote device receives the data from the patient support apparatuses and determines distances of each of the patient support apparatuses from a selected location within a healthcare facility.

In some embodiments, the remote device is further adapted to receive information indicating which of the patient support apparatuses are currently available for transporting a patient and to determine which one of the available patient support apparatuses is closest to the selected location. In some embodiments, the information indicating which of the plurality of patient support apparatuses are currently available for transporting a patient is transmitted by the patient support apparatuses themselves to the remote device.

In some embodiments, the remote device transmits routing instructions to the closest available patient support apparatus, which uses the routing instructions to drive itself to the selected location.

In some embodiments, the patient support apparatuses transmit messages to the remote device indicating that they are unavailable for transport when the charge status of their batteries falls below a threshold. Such patient support apparatuses may be configured to autonomously drive themselves to a battery charging location when the charge status of their batteries decreases below the threshold.

The remote device, in some embodiments, includes a user interface adapted to allow a user to select one of the plurality of patient support apparatuses. Once selected, the remote device summons the selected patient support apparatus to the selected location within the healthcare facility. The remote device may also be configured to allow the user to choose the selected location. The user interface may be part of an electronic mobile device carried by the user that is in wireless communication with the remote device.

In another embodiment, a patient support apparatus is provided that includes a frame, wheels, a support surface, a patient presence detector, a wireless transceiver, and a control system. The patient presence detector detects whether or not a patient is present on the support surface. The wireless transceiver transmits to a remote device a message indicating whether or not the patient is currently present on the support surface or not.

In some embodiments, the control system includes a drive subsystem adapted to operate in an autonomous mode and the control system automatically prevents the drive subsystem from operating in the autonomous mode when the patient presence detector indicates that the patient is currently present on the support surface.

The patient support apparatus may also be adapted to receive a summons from the remote device to drive to a selected location, wherein the drive subsystem drives the patient support apparatus to the selected location in the autonomous mode so long as a patient is currently not present on the support surface.

In other embodiments, the control system also receives data via the wireless transceiver indicating whether or not any patient is currently associated with the patient support apparatus or not. The control system automatically prevents the drive subsystem from operating in the autonomous mode when the patient presence detector indicates that the patient is currently present on the support surface, or when the data indicates that the patient is currently associated with the patient support apparatus.

The patient support apparatus may also include a bumper adapted to detect contact between the patient support apparatus and an object and to provide an indication to the control system when such contact is detected. The control system reduces a speed of the patient support apparatus when such contact is detected.

According to yet another embodiment, a patient support apparatus is provided that includes a frame, wheels, a support surface, an image sensor, and a control system. The image sensor captures images of an area within its field of view. The control system analyzes the images to detect objects, to identify at least some of the detected objects, to determine a relative velocity of the detected objects to the patient support apparatus, to use the relative velocity to determine if any of the detected objects have a likelihood of collision with the patient support apparatus that exceeds a threshold, and to provide an indication to a user of the patient support apparatus that a collision may be imminent.

The control system may be adapted to vary the indication depending upon where on the patient support apparatus the collision is likely to occur.

In some embodiments, the control system is adapted to identify walls and floors in the images and to determine a likelihood of collision with the walls.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
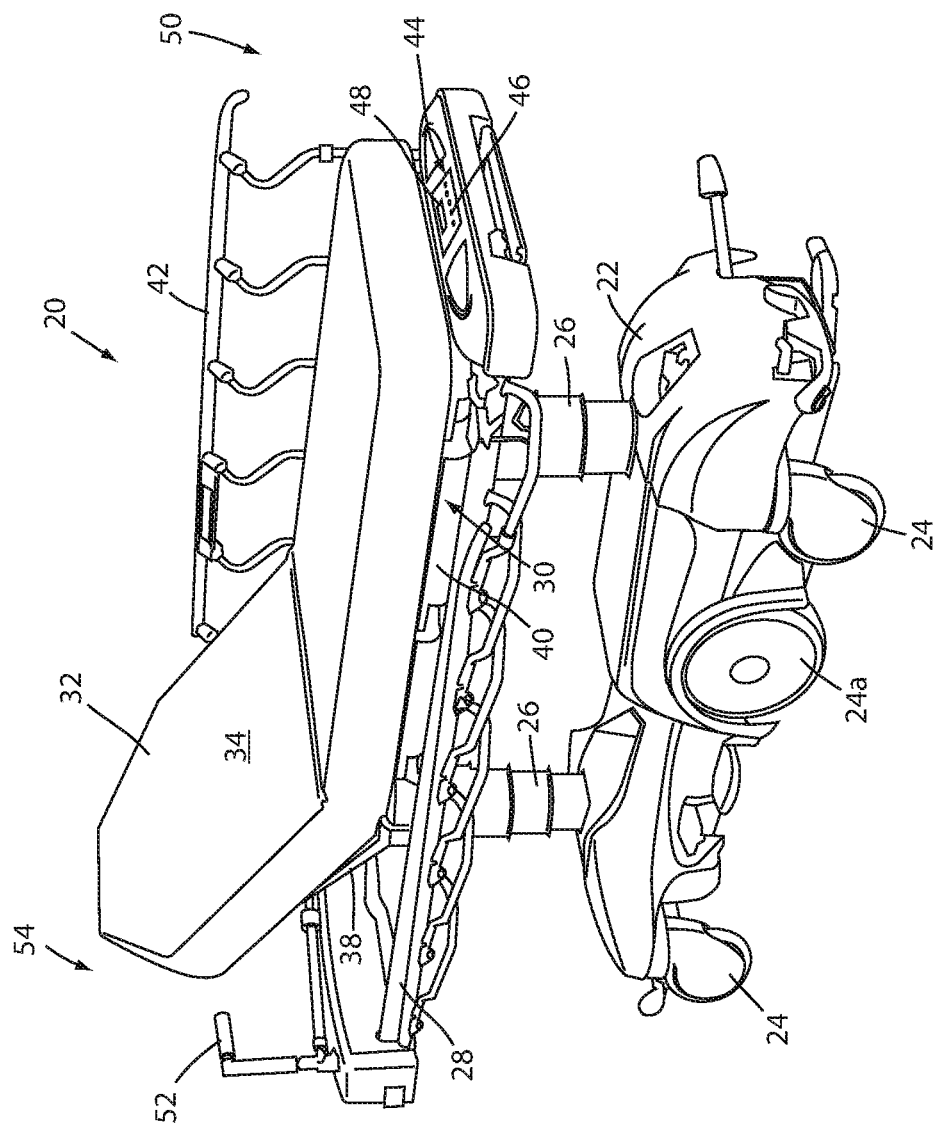
FIG. 1 is a perspective view of a first embodiment of an illustrative patient support apparatus that may incorporate aspects of the present disclosure.

A patient support apparatus 20 according to one embodiment of the present disclosure is shown in FIG. 1. Patient support apparatus 20, as shown in FIG. 1, is implemented as a stretcher. It will be understood, however, that patient support apparatus 20 can be alternatively implemented as a bed, a cot, a recliner, or other apparatus that is capable of supporting a person. Further, it will be understood that some of the embodiments of the present disclosure discussed herein can alternatively be incorporated into other types of patient care devices, such as, but not limited to, temperature management systems for controlling the temperature of patients and/or medical carts used to transport items used in conjunction with the treatment of patients. One such temperature management system is disclosed in commonly assigned U.S. patent application Ser. No. 14/282,383 filed May 20, 2014 by inventors Christopher J. Hopper et al. and entitled THERMAL CONTROL SYSTEM, the complete disclosure of which is hereby incorporated herein by reference.

Patient support apparatus 20 of FIG. 1 includes a base 22 having a plurality of wheels 24, a pair of lifts 26 supported on the base, a frame or litter 28 supported by the lifts 26, and a deck 30 that is supported on top of litter 28. Deck 30 supports a mattress 32, or other cushioning device, on which a patient may sit or lie. A top side of mattress 32 provides a support surface 34 for the patient.

Base 22 includes a plurality of brake pedals 36 that are adapted to selectively lock and unlock wheels 24 so that, when unlocked, patient support apparatus 20 may be wheeled to different locations. Lifts 26 are adapted to raise and lower frame 28 with respect to base 22. Lifts 26 may be hydraulic actuators, electric actuators, or any other suitable device for raising and lowering frame 28 with respect to base 22. In some embodiments, lifts 26 are operable independently so that the orientation of frame 28 with respect to base 22 can also be adjusted.

Support deck 30 is made of a plurality of sections, some of which are pivotable about generally horizontal pivot axes. In the embodiment shown in FIG. 1, support deck 30 includes an upper or head section 38 and a lower or foot section 40. Head section 38, which is also sometimes referred to as a Fowler section, is pivotable between a generally horizontal orientation (shown in FIG. 1) and a plurality of raised positions (not shown in FIG. 1).

A plurality of side rails 42 (FIG. 1) may also be coupled to frame 28. If patient support apparatus 20 is a bed, there may be four such side rails, one positioned at a left head end of frame 28, a second positioned at a left foot end of frame 28, a third positioned at a right head end of frame 28, and a fourth positioned at a right foot end of frame 28. If patient support apparatus 20 is a stretcher, such as shown in FIG. 1, or a cot, there may be fewer side rails, such as one side rail 42 on each side of patient support apparatus 20. In other embodiments, there may be no side rails on patient support apparatus 20. Regardless of the number of side rails, such side rails are movable between a raised position in which they block ingress and egress into and out of patient support apparatus 20, and a lowered position in which they are not an obstacle to such ingress and egress.

The construction of any of base 22, lifts 26, frame 28, support deck 30, and/or side rails 42 may take on any known or conventional design, such as, for example, those disclosed in commonly assigned, U.S. Pat. No. 7,395,564 issued to McDaniel et al. and entitled ARTICULATED SUPPORT SURFACE FOR A STRETCHER OR GURNEY, or commonly assigned U.S. Pat. No. 6,230,343 issued to Buiskool et al. and entitled UNITARY PEDAL CONTROL FOR HEIGHT OF A PATIENT SUPPORT, the complete disclosures of both of which are incorporated herein by reference. The construction of any of base 22, lifts 26, frame 28, support deck 30, and/or the side rails 42 may also take on forms different from what is disclosed in the aforementioned patents.

Patient support apparatus 20 also includes a user interface 44 positioned at a foot end 50 of support deck 30 (FIG. 1.). User interface 44 includes a plurality of buttons 46 and/or other controls that allow a user to control various powered and/or electronic functions of patient support apparatus 20. For example, user interface 44 may be configured to allow a user to control lifts 26 in order to change the height of support deck 30. User interface 44 may also include controls for controlling an exit detection system (discussed in greater detail below). Still further, in at least some embodiments, user interface 44 includes a display 48, such as, but not limited to, a Liquid Crystal Display (LCD), as well as controls for entering alphanumeric data into a control system of patient support apparatus 20.

In some embodiments, patient support apparatus 20 also includes at least one powered wheel 24a that is selectively driven by one or more motors. This reduces the amount of force required by a caregiver to push patient support apparatus 20 from one location to another. A pair of handles 52 positioned at a head end 54 of patient support apparatus 20 is used to control the driven wheel. That is, when a user pushes forward (in a direction from head end 54 toward foot end 50) on handles 52, driven wheel 24a drives patient support apparatus 20 in a forward direction. When a user pulls on handles 52 in a rearward direction, driven wheel 24a is braked and/or driven in a rearward direction. Further details of various embodiments of powered patient support apparatuses that can be driven to different locations are disclosed in commonly assigned U.S. Pat. No. 6,772,850, issued to Waters et al. and entitled POWER ASSISTED WHEELED CARRIAGES, as well as U.S. patent publication 2014/0076644 published Mar. 20, 2014 by inventors Richard Derenne et al. and entitled POWERED PATIENT SUPPORT APPARATUS, the complete disclosure of which is hereby incorporated herein by reference.

Figure 2:
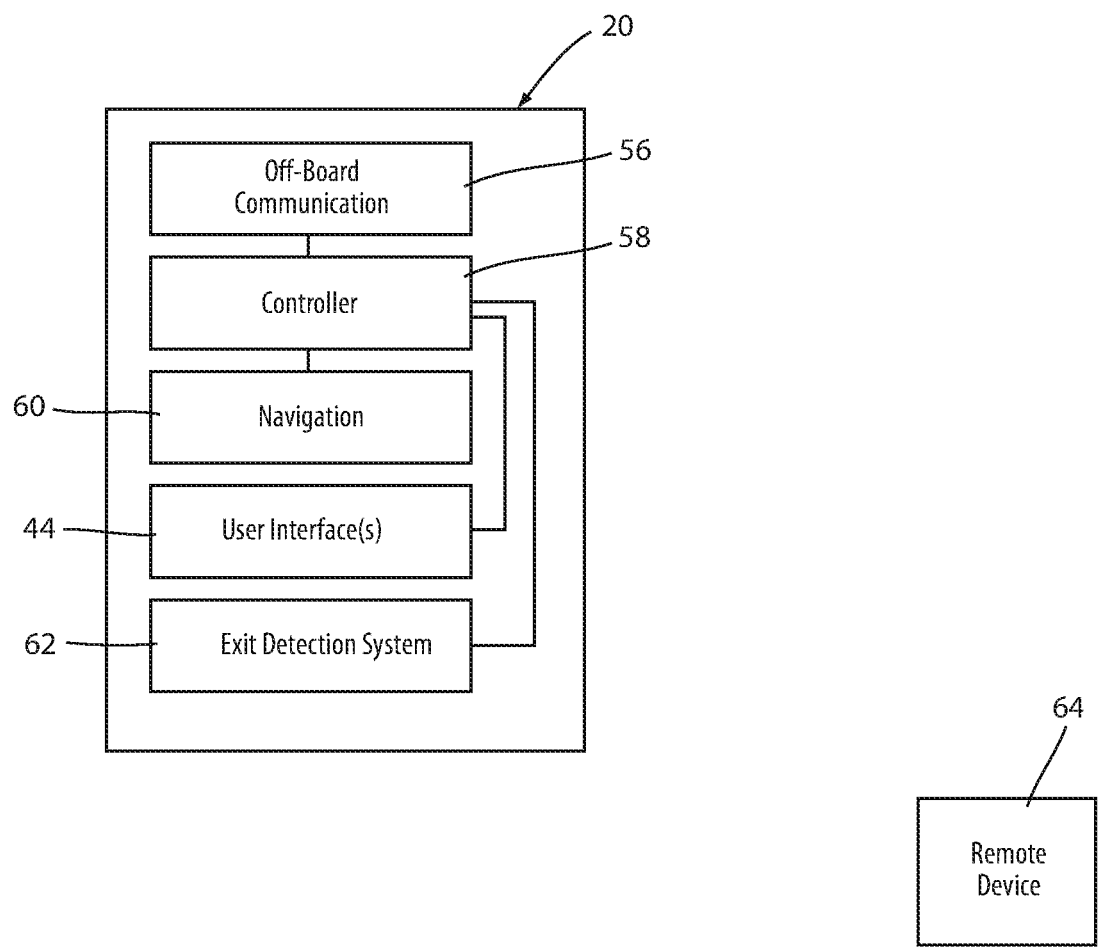
FIG. 2 is a block diagram of various components of the patient support apparatus of FIG. 1.

FIG. 2 illustrates several of the internal components of patient support apparatus 20 that are not visible in FIG. 1. These components include an off-board communication module 56, a controller 58, a navigation system 60, and an exit detection system 62. Off-board communication module 56 is adapted to wirelessly communicate with at least one remote device 64. Remote device 64 may be a server on a computer network of the healthcare facility in which patient support apparatus 20 is located. Alternatively, remote device 64 may be a server, or other computer device, that is located geographically remote from the healthcare facility in which patient support apparatus 20 is located, but in communication with patient support apparatus 20 via an Internet connection between the remote device 64 and the computer network of the healthcare facility (which patient support apparatus 20 communicates with via module 56). In some embodiments, off-board communication module 56 is a WiFi transceiver that is adapted to communicate using the WiFi protocol (e.g. any of the IEEE 802.11 standards) with one or more wireless access points of the healthcare facility's computer network. In other embodiments, off-board communication module 56 may utilize a different communication protocol, such as ZigBee (e.g. IEEE 802.15.4), or another communication protocol. In still other embodiments, communication module 56 may be configured to communicate using multiple different communication protocols.

Controller 58 (FIG. 2) is in communication with off-board communication module 56, navigation system 60, user interface 44, and exit detection system 62. Controller 58 processes the data received from each of these components and forwards, as appropriate, commands to one or more of the other components based upon the received data. In general, controller 58 oversees the operation of components 56, 60, 44, and 62, and coordinates communication between these components.

Controller 58 may take on a variety of different forms. In one embodiment, controller 58 is any one of the i.MX family of system-on-chip (SoC) processors, or any one of the Kinetis K60 family of microcontroller units (MCUs), both of which are marketed by Freescale Semiconductor of Austin, Tex. Other types of commercially available microcontrollers may also be used. Still further, controller 58 may take on still other forms, such as any combination of any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 58 in carrying out the functions described herein, as well as the data necessary for carrying out these functions, are stored in one or more accessible memories (not shown).

Navigation system 60 may take on a variety of different forms, some of which are described in greater detail below. In general, navigation system 60 is adapted to determine the location of patient support apparatus 20 within the healthcare facility when patient support apparatus 20 is mobile, as well as when patient support apparatus 20 is stationary. In some embodiments, navigation system 60 is also adapted to maintain a log of the locations that patient support apparatus 20 has traveled to within the healthcare facility. The log, in addition to the locations that patient support apparatus 20 has traveled to, includes time stamps for the locations. In other embodiments, the log is maintained partially or wholly at the remote device 64. In such embodiments, navigation system 60 communicates the data it generates to off-board communication module 56, which forwards the data to remote device 64. Various uses of the logged data are described in more detail below.

Exit detection system 62, when armed, is adapted to issue an alert (audio and/or visual; and local and/or remote) when it detects that an occupant of patient support apparatus 20 may be about to, or already has, exited from patient support apparatus 20. In some embodiments, exit detection system 62 includes a plurality of load cells that detect forces due to the patient's weight while positioned on support surface 34. Exit detection system 62 may take on any of the forms, and include any of the features, of those exit detection systems described in commonly assigned U.S. Pat. No. 5,276,432 issued to Travis and entitled PATIENT EXIT DETECTION MECHANISM FOR HOSPITAL BED; or commonly assigned U.S. patent application Ser. No. 14/212,367 filed Mar. 14, 2014 by inventors Michael Joseph Hayes et al. and entitled PATIENT SUPPORT APPARATUS WITH PATIENT INFORMATION SENSORS; commonly assigned U.S. patent application Ser. No. 62/065,242 filed Oct. 17, 2014 by inventors Marko N. Kostic et al. and entitled PERSON SUPPORT APPARATUS WITH MOTION MONITORING; commonly assigned U.S. patent application Ser. No. 14/692,871 filed Apr. 22, 2015 by inventors Marko N. Kostic et al. and entitled PERSON SUPPORT APPARATUS WITH POSITION MONITORING; or commonly assigned U.S. patent application Ser. No. 62/076,005 filed Nov. 6, 2014 by inventors Marko N. Kostic et al. and entitled EXIT DETECTION SYSTEM WITH COMPENSATION, the complete disclosure of all of which are incorporated herein by reference.

In some embodiments, exit detection system 62 also functions as a patient presence detection system. That is, when the load cells detect weight on deck 30 that is greater than an amount of weight expected due to mattress 32 and its associated bedding, exit detection system 62 informs controller 58 that a patient is present on patient support apparatus 20. In some embodiments, such as those discussed below with respect to patient support apparatus 220, controller 58 is configured to prevent the patient support apparatus 220 from driving itself autonomously while a patient is present, as will be discussed in greater detail below. In still other embodiments, the patient support apparatus is adapted to receive a message from an off-board device, such as an Admission, Discharge, and Tracking (ADT) computer on the healthcare facility's network that indicates whether or not a patient is currently assigned to that particular patient support apparatus. When a patient is currently assigned, controller 58 is configured, in some embodiments, to prevent the patient support apparatus from driving itself autonomously.

Figure 3:
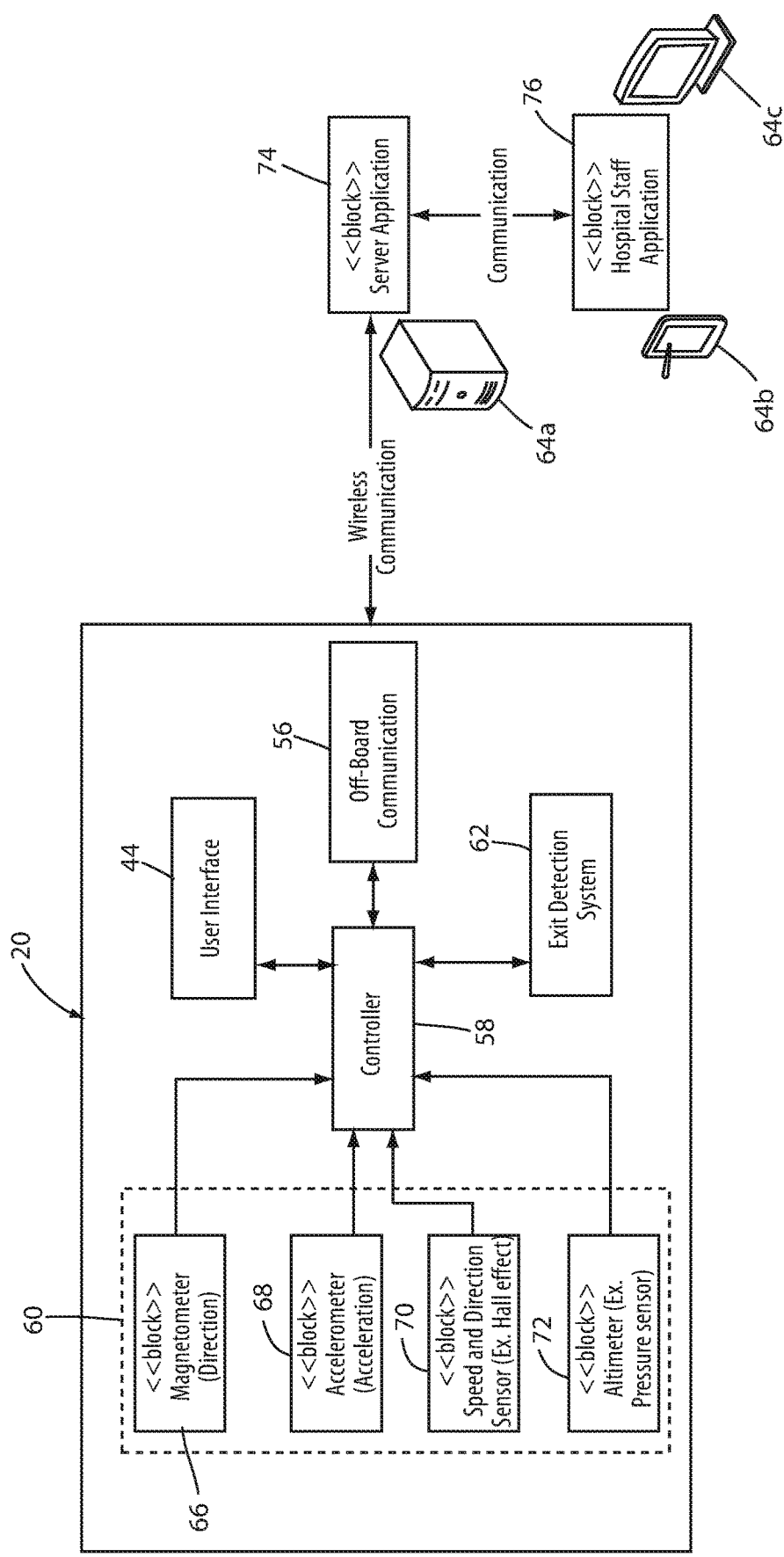
FIG. 3 is a block diagram of the patient support apparatus of FIG. 2 with more detail regarding a particular navigation system of the patient support apparatus, as well as the remote devices with which the patient support apparatus communicates.

FIG. 3 shows in greater detail one illustrative embodiment of navigation system 60 of patient support apparatus 20, as well as various alternative manners of implementing remote device 64. Navigation system 60 of FIG. 3 includes a magnetometer 66, one or more accelerometers 68, a speed and/or direction sensor 70, and an altimeter 72. These components all communicate with controller 58. Magnetometer 66 repetitively determines the geographical orientation of patient support apparatus 20 with respect to the Earth's magnetic field and communicates this information to controller 58. The accelerometers 68 detect accelerations of patient support apparatus 20, including both the magnitude and direction of the accelerations. In at least one embodiment, navigation system 60 includes accelerometers 68 that detect accelerations in both X and Y directions, where the labels "X" and "Y" refer to two orthogonal directions that are parallel to a horizontal plane. For example, in one embodiment, the X direction refers to the direction extending from head end 54 to foot end 50 of patient support apparatus 20, while the Y direction refers to the direction extending from a left side of patient support apparatus 20 to a right side, or vice versa. In still other embodiments, navigation system includes a third accelerometer that detects accelerations in a Z direction (e.g. up and down).

Regardless of the specific number of accelerometers 68, controller 58 integrates the outputs of the accelerometers 68 to determine an estimate of the speed and direction in which patient support apparatus 20 is moving. Controller 58 uses this information, along with heading information from the magnetometer, to determine and maintain an estimate of patient support apparatus 20's current location within the healthcare facility. Alternatively, in some embodiments, controller 58 forwards this information to remote device 64, which uses this information to determine and maintain an estimate of patient support apparatus 20's current location within the healthcare facility. In still other embodiments, both patient support apparatus 20 and remote device 64 maintain an estimate of the current location of patient support apparatus 20 within the healthcare facility.

Speed and direction sensors 70 (FIG. 3) provide an additional source of information for determining the location of patient support apparatus 20, as well as tracking its movement throughout the healthcare facility. That is, in addition to the speed and direction information generated from magnetometer 66 and accelerometers 68, speed and direction sensors 70 provide a second source of such information. In at least one embodiment, speed and direction sensors 70 include one or more wheel encoders that measure the number of rotations of one or wheels 24, including the direction in which the wheels rotate. From this information, along with knowledge of the circumference of wheels 24, controller 58 (and/or remote device 64) determines an estimate of the change in the location of patient support apparatus 20 (i.e. how far patient support apparatus 20 has traveled and in what direction(s)). The speed and direction information provided by accelerometers 68 may be combined with the speed and direction information from sensors 70 in any suitable manner. In at least one embodiment, the data from these two sources is combined using a Kalman filter, although other techniques may be used.

In addition to the relative changes in position detected by accelerometers 68 and sensors 70, patient support apparatus 20 may be configured to receive occasional updates of its absolute location within the healthcare facility by the detection of one or more fixed locators, or by other means. The occasional updating of the absolute position of the patient support apparatus 20 within the healthcare facility allows controller 58 and/or remote device 64 to remove errors in the position estimate of patient support apparatus 20 that accumulate over time, due to the accumulation of the errors in the signals from the sensors 68 and/or 70.

In one embodiment, the absolute position of patient support apparatus 20 is provided by fixed locators that comprise wall mounted beacons that transmit a short range message with a unique ID. The location of each of these wall mounted beacons is surveyed and stored in a memory (either on board patient support apparatus 20 and/or at remote device 64). Because the beacons only transmit over a very short range, the detection of their short range messages by communication module 56 means that patient support apparatus 20 is currently located essentially at the location of the beacon (or within a few feet of the beacon).

Examples of such an absolute positioning system, as well as other possible alternatives, are described in more detail in commonly assigned U.S. Pat. No. 8,319,633 issued Nov. 27, 2012 to David Becker et al. and entitled LOCATION DETECTION SYSTEM FOR A PATIENT HANDLING DEVICE, as well as commonly assigned U.S. patent application Ser. No. 62/145,276 filed Apr. 9, 2015 by inventors Michael Hayes et al. and entitled LOCATION DETECTION SYSTEMS AND METHODS, the complete disclosures of which are hereby incorporated herein by reference. Other types of absolute position updates may also be possible, including, but not limited to, those disclosed in commonly assigned U.S. patent application Ser. No. 14/559,458 filed Dec. 3, 2014, by inventors Michael Hayes et al. and entitled PATIENT SUPPORT APPARATUS COMMUNICATION SYSTEMS, the complete disclosure of which is hereby incorporated herein by reference.

Patient support apparatuses 20 may utilize still other types of absolute positioning systems in order to supplement the relative movement information provided by sensors 68 and 70. In some embodiments, as will be discussed in greater detail below, the patient support apparatuses 20 are equipped with image sensors and/or laser sensors that are adapted to detect landmarks within the healthcare facility. By correlating these detected landmarks to an electronic map of the locations of these landmarks, controller 58 is able to periodically determine its absolute position within the healthcare facility. Still other types of absolute positioning structures may be used.

Navigation system 60 allows patient support apparatus 20 and/or remote device 64 to track the movement of patient support apparatus 20 throughout the healthcare facility. More specifically, using the sensor information from navigation system 60, controller 58 and/or remote device 64 is able to determine the coordinates of patient support apparatus 20 within the healthcare facility, the direction in which it is traveling, and the velocity of such travel. In some embodiments, this information is communicated wirelessly to remote device 64. Remote device 64 includes an integrated floor plan and is in communication with hospital staff so that the current locations of each patient support apparatus 20, as well as their current movement, can be communicated to the hospital staff.

FIG. 3 also illustrates in greater detail one manner in which one or more remote devices 64 may be implemented for communication with patient support apparatuses 20. As shown therein, remote device 64 includes three separate components: a server 64a that executes a server software application 74; a mobile electronic device 64b that executes a healthcare staff software application 76; and a computer 64c that also executes the healthcare staff software application 76 (or a modified version of it). In some embodiments, healthcare staff software application 76 is installed on mobile electronic devices 64b as a cell phone app, while being installed on computers 64c as a desktop software application. Other variations of healthcare staff software application 76 are also possible.

Server application 74 determines the locations of each patient support apparatus 20 within the facility, updates those locations as the patient support apparatuses 20 move, and maintains a log of their locations over time. Server application 74 communicates all or a portion of this information to one or more staff devices (e.g. mobile device 64b and computer 64c) via healthcare staff application 76.

In at least one embodiment, server application 74 correlates the location information of each patient support apparatus 20 with the identity of the patients that are assigned to each of these patient support apparatuses 20. Application 74 also correlates the identity of the patients with the identity of their assigned respective healthcare providers (e.g. doctors, nurses, physical therapists, etc.). By tying the patient and caregiver identities to specific patient support apparatuses 20 and logging the history of the locations of each patient support apparatus 20, application 74 allows the hospital staff to know immediately which areas of the hospital may have been exposed to infectious diseases. That is, application 74 allows authorized individuals to access the location histories of each patient support apparatus 20. From this information, it can be determined where the patient support apparatus 20 was moved to within the hospital while being assigned to a patient with an infectious disease. This allows the hospital to track what locations are at potential risk for the spreading of the infectious disease, as well as to take appropriate disinfecting steps, or other countermeasures, for reducing the risk of the disease spreading.

In at least one embodiment, application 74 also keeps track of the times and locations at which patient support apparatus 20 is cleaned. This information is stored in the data log maintained on board patient support apparatus 20 and/or at remote device 64. This information allows hospital staff to identify, using application 76, all of the locations that patient support apparatus 20 traveled to between cleanings.

Application 74 also uses the speed and direction information received from navigation system 60 of patient support apparatus 20 to generate estimated times of arrival of patient support apparatuses 20 at their destinations. This allows caregivers and other healthcare staff to more efficiently coordinate their activities. In at least one such embodiment, a caregiver is able to access application 76 to determine an estimate of how much time before a particular patient support apparatus 20 arrives at the location of that caregiver, or at any other location that the caregiver may enter into application 76 using his or her mobile electronic device 64b (which may be a smart cell phone, a tablet computer, or other mobile electronic device).

Application 74 is also adapted, in at least one embodiment, to provide information to users regarding the location of the nearest patient support apparatus 20 that is available for transporting a patient. In one such embodiment, application 76 operates on a cell phone and automatically utilizes the conventional location services built into the cell phone, or a building specific location app that executes on the cell phone. In another embodiment, application 76 requires a user to enter his or her current location before application 74 determines the nearest available patient support apparatus 20.

When determining the nearest available patient support apparatus 20, application 74 takes into account the floorplans of the healthcare facility. That is, an electronic map of the floorplan of the healthcare facility is stored in a memory that is accessible to application 74. The map includes the locations of walls, obstacles, elevators, doorways, and other aspects of the healthcare facility. Application 74 uses this information to compute the nearest available patient support apparatus 20 based upon the actual path the patient support apparatus 20 will have to follow to a particular location, which may or may not be the closest patient support apparatus 20 when measured in absolute terms that ignore walls, obstacles, and the like. In some embodiments, application 74 is configured to alternatively, or additionally, determine the nearest available patient support apparatus 20 in terms of the estimated amount of time it will take to transport the patient support apparatus 20 to the desired location. This determination may take into account estimates of the amount of time it may take for the patient support apparatuses to travel certain pathways, particular in those areas where the estimated travel time for the corresponding distance may be larger than the estimated travel time for a similar distance in other areas of the facility. Such areas may include elevators, areas of heavy traffic or congestion, or still other areas.

When determining the nearest available patient support apparatus 20, application 74 repetitively receives information regarding which of the patient support apparatuses 20 are currently available for transporting a patient. Patient support apparatuses are considered "available" when they meet certain criteria, which may vary from healthcare facility to healthcare facility. In general, a patient support apparatus 20 is available when it is not currently assigned to a patient, it has been cleaned since being previously used, and, in some cases, its battery—if it has one—is sufficiently charged. Other criteria may also be used to classify patient support apparatuses as available.

In at least one embodiment, application 74 communicates with a conventional Admission, Discharge, and Tracking (ADT) system of the healthcare facility in order to determine which of the patient support apparatuses 20 are currently assigned to patients. In some embodiments, application 74 may also communicate with a conventional bed or stretcher management system of the healthcare facility that keeps track of the cleanliness status of each bed and/or stretcher. Application 74 uses this information to classify each patient support apparatus 20 into an available state or unavailable state.

In still other embodiments, each patient support apparatus 20 includes a button 46, or other type of control, on its user interface 44 that an authorized individual presses after the patient support apparatus has been cleaned and is no longer assigned to a patient (and/or after any other criteria are satisfied that are required before the patient support apparatuses 20 are considered available). After such information is entered into patient support apparatus 20 via user interface 44, controller 58 forwards this information to off-board communication module 56, which transmits the information to remote device 64a. Server application 74 uses the information to determine the nearest available patient support apparatus 20 to any user of remote devices 64b and/or 64c, which communicate with server application 74 via staff application 76.

In order to prevent unauthorized individuals from entering information into a patient support apparatus 20 that indicates that the patient support apparatus 20 is available, user interface 44 may be configured to require a code, or other information, before allowing the user to designate the patient support apparatus 20 as being available. In some such embodiments, the user may have to enter a user ID, either manually or by swiping his or her employee ID card through a card reader incorporated into the patient support apparatus 20. Still other steps may be taken before allowing the user to designate the patient support apparatus as being available.

In addition to maintaining the current location of patient support apparatuses 20, application 74 is configured, in at least one embodiment, to also keep track of the cumulative distance traveled by each patient support apparatus 20. This information is maintained by summing the distances between the locations that are repetitively detected and reported by each patient support apparatus. Application 74 utilizes this information to provide indications to appropriate personnel of the healthcare facility of the need to perform maintenance work on the patient support apparatuses 20. That is, when the total distance traveled by a patient support apparatus 20 exceeds a threshold, application 74 generates an alert indicating that maintenance should be performed on that particular patient support apparatus 20. The alert is communicated to staff application 76, in at least one embodiment, so that personnel carrying mobile electronic devices 64b and/or personnel using computers 64c will be alerted to the maintenance needs of the patient support apparatus 20. In some embodiments, application 74 also sends the alert to patient support apparatuses 20, which convey the alert to nearby personnel visually and/or aurally.

In still other embodiments, the task of keeping track of the cumulative distance traveled by a patient support apparatus 20 is carried out locally on each patient support apparatus 20 by its controller 58. In such embodiments, patient support apparatuses 20 include an onboard odometer, or structure capable of performing the same function as an odometer. Further, controller 58 is configured, in some embodiments, to compare the distance traveled to one or more thresholds, to determine whether maintenance work is due.

Patient support apparatuses 20 are further configured to allow authorized individuals to input information—via user interface 44—indicating when maintenance work has been performed. This resets the threshold that the odometer reading (whether maintained locally on patient support apparatus 20 and/or at server 64a) is compared to for determining when the next routine maintenance is to be performed.

In still other embodiments, when patient support apparatuses 20 include a battery, controller 58 is configured to periodically transmit the current charge status of the battery to server 64a. Server 64a uses this information for at least one of two different purposes. In one embodiment, server application 74 uses this information as part of the criteria for determining whether or not a patient support apparatus 20 is available for transport. That is, if the battery is not charged above a threshold, the application 74 considers the patient support apparatus 20 as being unavailable for transport (at least until the battery is recharged). In another embodiment, application 74 uses this information to alert appropriate personnel that the battery on a particular patient support apparatus 20 needs charging. This alerting is done by comparing the charge level of the battery to a threshold and, if the charge level is less than the threshold, sending an alert to the staff application 76. Staff members who have access to one of the mobile electronic devices 64b and/or the computers 64c will then receive an alert indicating that a patient support apparatus 20 needs to be recharged. The alert will include, in at least one embodiment, a current location of the patient support apparatus 20 whose battery needs recharging. In still other embodiments, application 76 utilizes the battery information in performing both tasks: determining whether the patient support apparatus 20 is available or not, and determining whether to issue a low battery alert or not.

In some instances, patient support apparatuses 20 may also include circuitry that monitors the health of the battery (in addition to its current charge status). Such monitoring results in an estimate of the current health of the battery, which may indicate when a battery needs to be replaced (as opposed to simply recharged). Examples of such health monitoring, as well as circuitry for carrying out this health monitoring, are disclosed in commonly assigned U.S. patent application Ser. No. 62/160,155 filed May 12, 2015 by inventors Aaron Furman et al. and entitled BATTERY MANAGEMENT FOR PATIENT SUPPORT APPARATUSES, the complete disclosure of which is hereby incorporated herein by reference.

When one or more patient support apparatuses 20 are configured to transmit battery health information to server 64a, application 74 uses this health information in ways similar to the way it uses the battery charge status information. That is, it uses the health information to determine the available or unavailable status of a particular patient support apparatus 20 and/or it uses the health information to issue an alert to appropriate personnel indicating that the battery of a particular patient support apparatus 20 needs to be replaced.

In all of the communications between patient support apparatus 20 and server 64a, it will be understood that patient support apparatus 20 transmits a unique ID that distinguishes patient support apparatus 20 from other patient support apparatuses, as well as from other medical devices that may be in communication with server 64a. This allows server 64a to sort the messages it receives from the various patient support apparatuses 20 according to the sender, as well as to transmit messages back to specific patient support apparatuses 20.

In some embodiments, staff software application 76 is configured to display a map of at least a portion of the floorplan of the healthcare facility. In addition to the map, application 76 is configured to display the locations of the currently available patient support apparatuses 20. Further, in at least some embodiments, application 76 includes user interface features that allow the user to search for patient support apparatuses 20 using various criteria, such as by the nearest available patient support apparatus, by a specific type of patient support apparatus (e.g. bed, cot, or stretcher), by the battery charge statuses of the patient support apparatuses, by one or more features that are available on the patient support apparatus (e.g. an exit detection system 62, a built-in propulsion system (discussed more below), the ability to travel autonomously (also discussed more below)), or by still other criteria. In some embodiments, application 76 is configured to also allow searching by combinations of these criteria, thereby enabling the user to search for, as an example, the nearest available bed having a built-in propulsion system with a battery that is fully charged.

Once application 76 has identified the patient support apparatuses 20 that meet the searcher's criteria, application 76 displays those patient support apparatuses 20 on the floorplan map, showing the searcher the location of the one or more patient support apparatuses that match his or her search criteria. In some embodiments, the searcher then walks to a selected one of the identified patient support apparatuses 20. In other embodiments, as will be discussed in greater detail below, application 76 is configured to allow the searcher to enter a command that summons the patient support apparatus 20 to his or her current location or to some other location of the user's choosing. In those embodiments, the patient support apparatuses are constructed to autonomously drive themselves to the commanded destination (i.e. drive themselves without the need for anyone to accompany the patient support apparatus 20).

Figure 4:
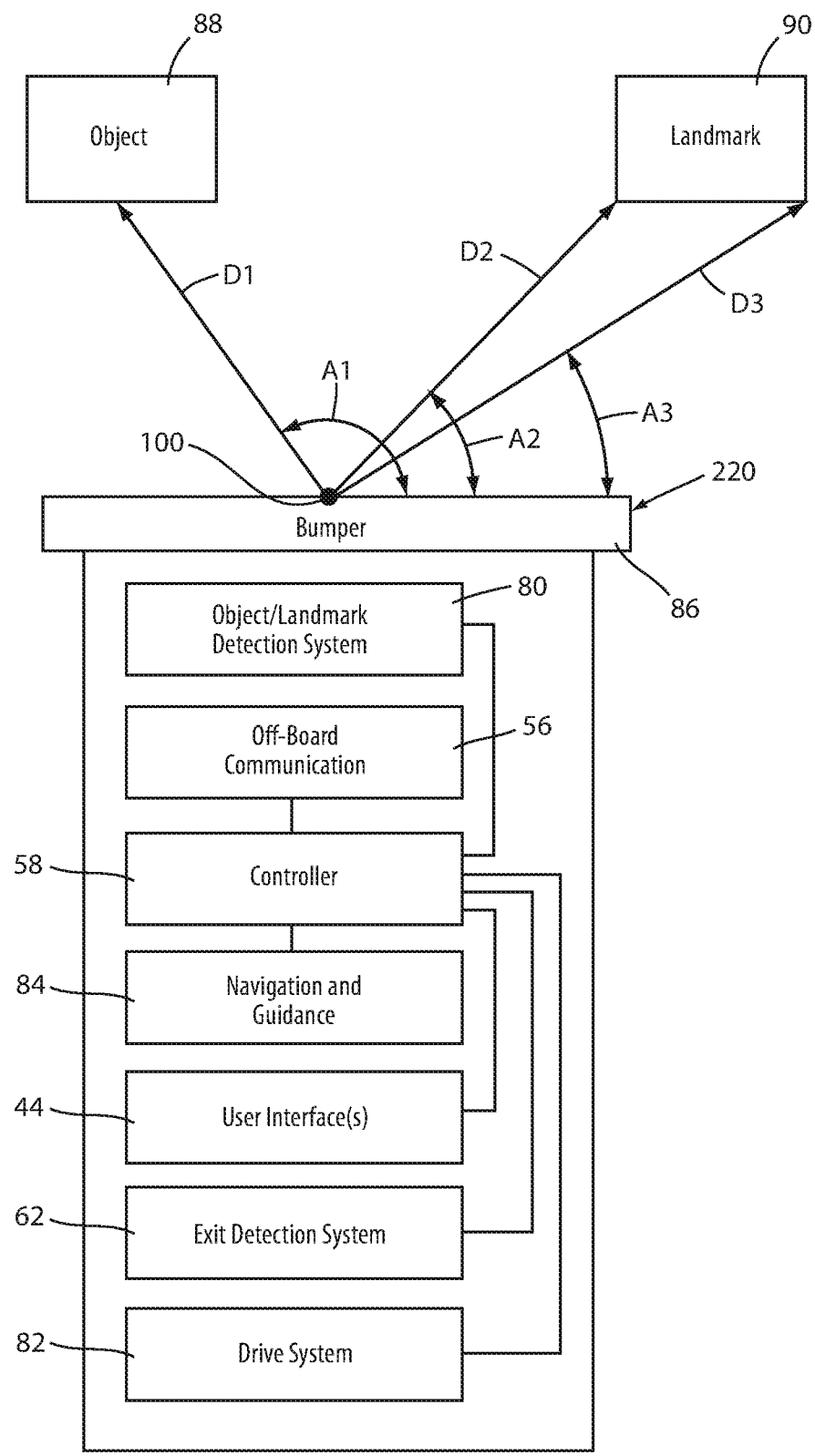
FIG. 4 is a block diagram of a patient support apparatus according to a second embodiment of the present disclosure.

FIG. 4 illustrates a patient support apparatus 220 according to a second embodiment of the disclosure. Those components of patient support apparatus 220 that are common to patient support apparatus 20, and that operate in the same manner, are identified with the same reference numbers, and are not discussed further in detail below. Those components of patient support apparatus 220 that are not found in patient support apparatus 20 are identified with a new reference number and are discussed in greater detail below. Patient support apparatus 220 differs from patient support apparatus 20 in that it includes an object/landmark detection system 80, a drive system 82, and—instead of a navigation system 60—a navigation and guidance system 84. Patient support apparatus 220 also includes a bumper 86. The function of these additional components will now be described in more detail.

Object/landmark detection system 80 is configured to detect the presence of one or more objects 88 (FIG. 4) that may be within or near the pathway of patient support apparatus 220. As will be discussed in greater detail below, when detecting the presence of one or more objects 88, system 80 is configured to determine the location of the detected object 88 relative to the location of patient support apparatus 220. In some embodiments, object/landmark detection system 80 is also configured to identify one or more landmarks 90. Landmarks 90 may take on a variety of different forms. In some embodiments, landmarks 90 include signs positioned on walls of the healthcare facility (including room numbers), lines or symbols painted on the floor, ceiling structures, elevators, stairways, doors and/or markings on the doors, and still other items. In general, landmarks 90 are items that are tied to specific locations with a facility, are recognizable by system 80, and typically do not move. Objects 88, in contrast, are not necessarily tied to any particular location, may or may not be recognizable by system 80, and may or may not move.

The identification of a particular landmark 90 provides patient support apparatus 220 with information about the current location of patient support apparatus 220 within the healthcare facility. If the particular landmark is unique to the healthcare facility, the identification of that landmark provides patient support apparatus 220 with an absolute position update. When object/landmark detection system 80 detects a landmark, system 80 consults an internal map of the location of the landmark and determines patient support apparatus 220's absolute position within the healthcare facility based upon patient support apparatus 220's position relative to the landmark. Object/landmark detection system 80 then forwards this location information to navigation and guidance system 84, which uses it to update its estimate of the current location of patient support apparatus 220 within the healthcare facility.

Navigation and guidance system 84 includes a navigation subsystem that is, in some embodiments, the same as navigation system 60. Navigation and guidance system 84 also includes a guidance subsystem. The guidance subsystem allows patient support apparatus 220 to autonomously follow a path or route to an intended destination. That is, guidance subsystem allows patient support apparatus 220 to drive itself to an intended destination without the need for a person to accompany patient support apparatus 220 while it is moving. As discussed more below, such autonomous guidance enables patient support apparatus 220 to steer itself around obstacles and follow a route to the intended destination. The guidance subsystem also allows patient support apparatus 220 to control its movement in a way that avoids or reduces the likelihood of collisions with objects.

Patient support apparatus 220 also includes a drive system 82. Drive system 82 includes one or more motors for driving one or more of the wheels 24, as well as one or more motors for steering one or more of the wheels 24. In some instances, patient support apparatus 220 is differentially steered by driving two or more wheels at different speeds, thereby avoiding the need for a separate steering motor. Some examples of various forms of drive systems that may be used with patient support apparatus 220 are disclosed in the aforementioned commonly assigned U.S. patent publication 2014/0076644, which was published on Mar. 20, 2014, and entitled POWER PATIENT SUPPORT APPARATUS, the complete disclosure of which is hereby incorporated herein by reference. Drive system 82 drives patient support apparatus 220 in such a manner that it follows a path dictated by the guidance subsystem of navigation and guidance system 84. In some embodiment, the path originates from the guidance subsystem, while in other embodiments, the path is transmitted to patient support apparatus 220 from remote device 64.

Patient support apparatus 220 also includes at least one bumper 86. In some embodiments, bumper 86 is a passive bumper that merely cushions any impact of patient support apparatus 220 against a person or object, thereby decreasing the chances of any injury or damage to either patient support apparatus 220 or the impacted person/object. In other embodiments, bumper 86 is an active bumper that includes sensors for detecting when it impacts an object. The outputs from the sensors are forwarded to controller 58 that sends commands to drive system 82 to steer and/or brake patient support apparatus 220 so as to reduce or avoid any further impact. Such active bumpers add an increased level of safety for avoiding collisions with objects that may not be detected by object/landmark detection system 80. Such active bumpers may take on any of a variety of different forms, including those found in conventional material handling automatic guided vehicles, some of which are disclosed, for example, in U.S. Pat. No. 6,739,635 issued to Byun.

Patient support apparatus 220 can also be modified to include a second bumper. In the embodiment shown in FIG. 4, patient support apparatus 220 includes only a single bumper 86 positioned at a leading end of patient support apparatus 220. In some embodiments, however, drive system 82 of patient support apparatus 220 is configured to drive patient support apparatus 220 backward (i.e. in a direction extending from head end 54 toward foot end 50). In such cases, a second bumper 86 is positioned at foot end 50 of patient support apparatus 220 is included.

Figure 5:
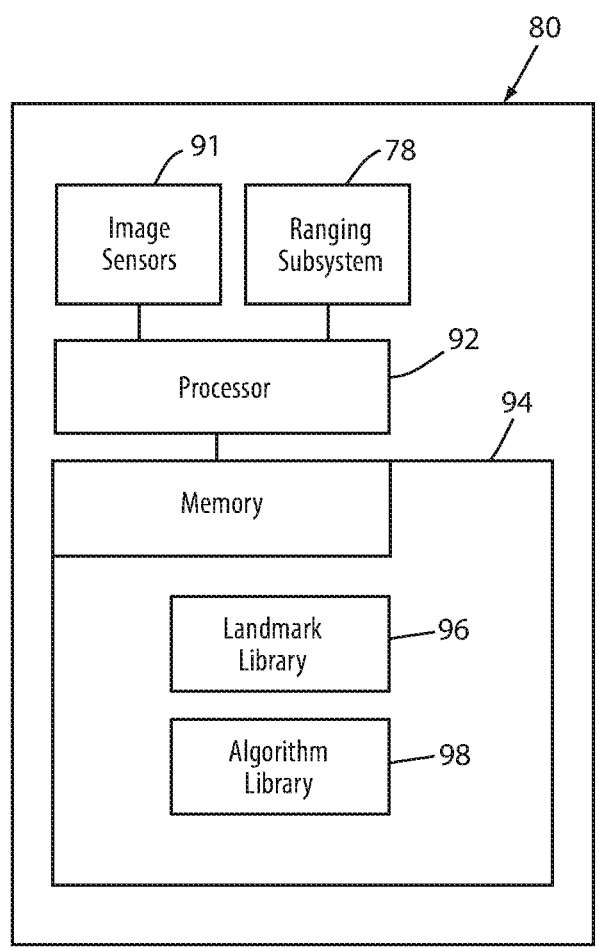
FIG. 5 is a block diagram of one embodiment of a landmark/object detection system that may be used with the patient support apparatus of FIG. 4.

FIG. 5 shows in greater detail one illustrative embodiment of object/landmark detection system 80. Object/landmark detection system 80 includes one or more image sensors 91, a processor 92, a ranging subsystem 78, and a memory 94. Memory 94 stores the instructions executed by processor 92. Memory 94 also includes a landmark library 96 and an algorithm library 98. In at least one embodiment, image sensors 91 are cameras, or other light sensing devices that are capable of capturing images. In other embodiments, image sensors 91 are two or three dimensional video cameras. Image sensors 91 are attached to patient support apparatus 20 at any suitable location, and may include multiple image sensors attached at multiple different locations. In general, image sensors 91 are attached at locations where a field of view of the image sensor overlaps with the direction in which the patient support apparatus is capable of being driven by drive system 82. In at least some embodiments, multiple image sensors 91 are coupled to patient support apparatus 20 at different locations and orientations, and the relative distance between the image sensors 91, as well as their angular orientation with respect to each other, is used to capture three-dimensional images.

Processor 92 is programmed to process the images generated by image sensors 91 and detect objects 88 and/or identify any landmarks 90 that may be represented in any of the images. Processor 92 identifies landmarks 90 by comparing the visual images captured by image sensors 91 to information stored in landmark library 96. Landmark library 96 includes information stored therein about each of the landmarks 90 that object/landmark detection system 80 is adapted to detect. More specifically, landmark library 96 includes landmark descriptors such as the color, size, shape, and location information for each landmark 90. Landmark library 96 may further include any other information about the landmarks 90 that is useful for processor 92 to identify such landmarks within the images generated by image sensors 91.

In processing the images from sensors 91 and identifying any objects 88 and/or landmarks 90 that may be present within the images, processor 92 is also adapted to utilize a plurality of image processing algorithms. These algorithms are stored in algorithm library 98. In at least one embodiment, algorithm library 98—and/or other areas of memory 94—includes the commercially available software suite referred to as OpenCV (Open Source Computer Vision Library), which is an open source computer vision library supported by Willow Garage of Menlo Park, Calif. The OpenCV library has been released under the Berkeley Software Distribution (BSD) open source license. The OpenCV library has more than 2500 computer vision algorithms and is available for use with various commercially available operating systems, including Microsoft Windows, Linux/Mac, and iOS. The OpenCV algorithms include a comprehensive set of computer vision and machine learning algorithms. These algorithms are designed to be used to detect and recognize faces, identify objects, classify human actions in videos, track camera movements, track moving objects, extract 3D models of objects, produce 3D point clouds from stereo cameras, stitch images together to produce high resolution images of entire scenes, find similar images from an image database, follow eye movements, recognize scenery and establish markers to overlay scenery with augmented reality, and other tasks.

Any of the major releases of OpenCV (e.g. versions 1.0, 2.0, and 3.0), as well as any one of the multiple intermediate versions, is suitable for carrying out the features and functions of processor 92 described in more detail herein. In at least one embodiment of object/landmark detection system 80, customized software is added to interact with and utilize various of the software algorithms of the OpenCV library in order to carry out the features described herein. Other commercially available software may also be used, either in addition to or in lieu of the OpenCV library.

In at least one embodiment, object/landmark detection system 80 includes the same images sensors, processor, and data libraries as those disclosed in commonly assigned U.S. patent application Ser. No. 14/578,630 filed Dec. 22, 2014 by inventors Richard Derenne et al. and entitled VIDEO MONITORING SYSTEM, the complete disclosure of which is hereby incorporated herein by reference. In such an embodiment, object/landmark detection system 80 is not only able to detect objects and landmarks, it is also able to detect their position and distance relative to patient support apparatus 220.

Ranging subsystem 78 of object/landmark detection system 80 is utilized in conjunction with the image data gathered from image sensor 91 in order to determine the distances from the patient support apparatus 220 to the objects that appear within the image data. The ranging subsystem can be implemented in different forms, such as by using infrared, laser, radar, and other technologies. Two different manners for implementing the ranging subsystem 78 are discussed below in more detail with respect to FIGS. 8 and 9.

Processor 92 is programmed to analyze the images detected by sensors 91 and take appropriate corrective measures so as to avoid or minimize the risk of patient support apparatus 220 colliding with a person or object. More specifically, processor 92 is adapted to identify objects and/or landmarks using the image data from image sensors 91, determine the location of the objects 88 and landmarks 90 using information from ranging subsystem 78, and report that information to navigation and guidance system 84. The reported information includes the distance of the objects 88 and/or landmarks 90 from patient support apparatus 220 (such as a predefined reference location on patient support apparatus 220), as well as the location of the objects in a coordinate frame of reference that is correlated with the current position of patient support apparatus 220. That is, system 80 reports the location of objects 88 and/or landmarks 90 to navigation and guidance system 84 either in the same coordinate frame of reference that navigation and guidance system 84 uses to identify the location of patient support apparatus 220, or with sufficient information to allow navigation and guidance system 84 to convert the location information of objects 88 (and/or 90) and patient support apparatus 220 into a common coordinate frame of reference. In this manner, navigation and guidance system 84 is able to determine the relative location of the objects 88 and/or landmarks 90 to patient support apparatus 220.

In at least one embodiment, object/landmark detection system 80 determines the location of each object 88 and landmark 90 by calculating a distance D (FIG. 4) between the object 88 or landmark 90 and a reference point on patient support apparatus 220, such as reference point 100. In addition to determining the distance D, system 80 also calculates the angle of the object 88 or landmark 90 relative to a known reference line or plane, such as the front end of bumper 86, that passes through reference point 100. Thus, in the arbitrary example illustrated in FIG. 4, object 88 is detected by system 80 to be located at a distance D1 and an angle of A1. This information is reported to navigation and guidance system 84.

Object/landmark detection system 80 also determines a general shape of the objects 88 and landmarks 90. As will be discussed in greater detail below, this enables navigation and guidance system 84 to determine if there is a likelihood of a collision between patient support apparatus 220 and any point on objects 88 or landmarks 90. In other words, navigation and guidance system 84 takes into account not only the likelihood of colliding with the center of the object or landmark, but also the likelihood of colliding with any other points on the objects or landmarks. When so adapted, in the arbitrary example of FIG. 4, object/landmark detection system 80 detects the location of landmark 90 as extending between a first location identified by distance D2 and angle A2 and a second location identified by distance D3 and angle A3. Other forms of identifying the space occupied by objects 88 and/or landmarks 90 may be used.

In most embodiments, object/landmark detection system 80 also determines information about the shape and position of objects 88 and landmarks 90 in a vertical direction. That is, system 80 also determines, not only the height of objects 88 and/or landmarks 90, but any variation in the shape of the horizontal cross sections of the object or landmark at different heights. In this manner, for example, object/landmark detection system 80 is able to determine whether or not an object 88, for example, has a footprint on the floor that is uniform throughout the entire height of the object 88, or that varies. This determination can be especially useful for some objects such as tables, which may occupy relatively small amounts of space at their leg or legs, and much larger amounts of space at their top surfaces. By determining this information, navigation and guidance system 84, as discussed below, takes steps to mitigate the risk of collisions between patient support apparatus 220 and any portion of the detected object 88 (not just those portions at the ground level, or some other discrete height). Object/landmark detection system 80 therefore not only passes information about the horizontal angles of the position of an object 88 to navigation and guidance system 84, but also passes information about vertical angles of the position of the object. Further, in some cases, system 80 passes to navigation and guidance system 84 a set of data that defines all of the visible outside edges of the object 88 (both horizontally and vertically) so that navigation and guidance system 84 knows the entire visible shape of the object 88 (or landmark 90), and can compare this to the known dimensions and shape of patient support apparatus 220 so as to determine a likelihood of a collision.

Object/landmark detection system 80 also uses landmark library 96 and algorithm library 98 to determine whether any detected objects 88 can be categorized as landmarks 90. That is, system 80 compares the image data captured from image sensors 91 to the image attribute data stored in library 96 of known landmarks. If system 80 does not find a match, then the object remains classified as an object 88. If system 80 determines that there is a match, however, then system 80 classifies the object as a landmark.

When object/landmark detection system 80 classifies an object as a landmark 90, it determines the location of the identified landmark 90 and forwards it to navigation and guidance system 84, as mentioned previously. In addition, system 80 determines if the identified landmark 90 is a landmark that is a potential collision risk or not. For example, some landmarks 90 include signs positioned on walls, room numbers positioned on or adjacent doors and doorways, lines or symbols painted on the floor or walls (or otherwise affixed thereto), and/or other types of indicia that do not present a collision possibility. When system 80 identifies a landmark 90 as something that is not a collision risk, it transmits this information to navigation and guidance system 84 and, as a result, navigation and guidance system 84 does not issue any motion commands to drive system 82 that seek to avoid the landmarks 90. In other words, navigation and guidance system 84 only steers and drives patient support apparatus 220 (via drive system 82) in a manner that avoids objects 88 and landmarks 90 that are collision risks, and ignores landmarks 90 that are not collision risks (at least as far as motion commands are concerned)

After receiving the location and shape information regarding objects 88 and/or landmarks 90, navigation and guidance system 84 uses this information to calculate an estimate of the probability of patient support apparatus 220 colliding with one or more of the objects 88 and/or one or more of the landmarks 90 that are collision risks. In calculating the probability, navigation and guidance system 84 utilizes not only the location of objects 88 and landmarks 90, but also the current speed and heading of patient support apparatus 220. The speed and heading information comes from sensors contained with the navigation subsystem (e.g. one or more magnetometers, accelerometers, speed and direction sensors, and/or altimeters). In calculating this probability of a collision, navigation and guidance system 84 also utilizes information about the shape and dimensions of patient support apparatus 220. More specifically, navigation and guidance system 84 utilizes the shape and dimensions of patient support apparatus 220 in order to determine if any corner, edge, or other portion of patient support apparatus 220 is likely to collide with any portion of the object 88 and/or landmark 90.

This means, for example, that system 84 may determine that the likelihood of patient support apparatus 220 colliding with a leg of a table is low, but that the likelihood of colliding with the surface of the table (whose edges stick out farther than the legs) is high. In such a case, navigation and guidance system 84 takes steps to reduce this risk, as will be discussed more below.

In at least some embodiments, navigation and guidance system 84 also takes into account a weight of a patient, or other objects, that are positioned on support surface 34 when calculating a likelihood of collision, and/or when determining an appropriate measure to reduce the likelihood of collision. In such embodiments, patient support apparatus 220 is equipped with a built-in scale system that measures the weight of the patient, or other objects supported on surface 34. This weight is used to estimate how much force will be needed to stop, slow, and/or change the direction of patient support apparatus 220. That is, the greater the measured weight, the more mass that must be accelerated or decelerated, and the acceleration or deceleration of more mass requires greater force. Navigation and guidance system 84 will therefore output commands to drive system 82 that are adjusted based upon differing amounts of force needed due to different weight being carried by patient support apparatus 220.

In calculating the probability of a potential collision with an object 88 or landmark 90, navigation and guidance system 84 is configured, in at least one embodiment, to also utilize the rates of change of the speed and direction of patient support apparatus 220. That is, in addition to the speed and direction in which patient support apparatus 220 is currently traveling, navigation and guidance system 84 utilizes measurements of the change in the speed and direction of patient support apparatus 220. This allows navigation and guidance system 84 to take into account any steering (changes in direction) that drive system 82 is currently undertaking, as well as any acceleration or decelerations. In some embodiments, system 84 alternatively—or additionally—takes into account the rate of change of the relative speed between patient support apparatus 220 and each of the detected objects 88, as well as the rate of change of the relative angular orientation between patient support apparatus 220 and each of the detected objects 88. This enables navigation and guidance system 84 to better account for movements of objects 88.

Regardless of the specific factors utilized by navigation and guidance system 84 in determining a probability of a collision with object 88 or landmark 90, navigation and guidance system 84 compares the determined probability to a threshold. If the probability exceeds a threshold, navigation and guidance system 84 issues motion commands to drive system 82 that change the speed and/or direction of patient support apparatus 220. The motion commands are generated in a manner that reduces the likelihood of collision. The motion commands include braking, steering, and acceleration.

After issuing one or more motion commands to drive system 82, navigation and guidance system 84 processes another set of data received from object/landmark detection system 80 about the position, orientation, and shape of objects 88 and landmarks 90. In other words, object/landmark detection system 80 repetitively captures images of objects 88 and landmarks 90 and analyzes these images in the manner discussed above. The results of these repeated image analyses are forwarded to navigation and guidance system 84, which generates repeated motion commands to drive system 82. Collectively, object/landmark detection system 80, navigation and guidance system 84, and drive system 82 therefore operate in a closed loop fashion for collision avoidance. Object/landmark detection system 80 provides repetitive feedback to navigation and guidance system 84 about the effectiveness of the previous sets of motion commands it forwarded to drive system 82. The motion commands sent to drive system 82 are therefore repetitively updated and dynamically adjusted while an object or landmark is within the field of view of object/landmark detection system 80.

In addition to controlling the movement of patient support apparatus 220 in a manner that it avoids collisions, navigation and guidance system 84 is configured to control drive system 82 in such a manner that patient support apparatus 220 may be directed to one or more desired destinations within a healthcare facility. In some embodiments, the guidance subsystem of navigation and guidance system 84 includes a map of the healthcare facility, and the guidance subsystem uses the map to output motion commands to drive system 82 that direct patient support apparatus 220 toward a desired destination. The motion commands used to guide patient support apparatus 220 to a desired destination are overridden, temporarily paused, or modified, when an object 88 or landmark 90 is detected that poses a risk of collision above the threshold (discussed previously). That is, navigation and guidance system 84 alters the steering and driving of patient support apparatus 220 so as to avoid a collision, while still directing patient support apparatus 220 to the desired destination. In some instances, navigation and guidance system 84 may cease all motion of patient support apparatus 220 when a mobile object 88 is present until the mobile object is moved out of the way of patient support apparatus 220, at which point navigation and guidance system 84 resumes driving patient support apparatus 220 to the desired destination.

In combination, object/landmark detection system 80, navigation and guidance system 84, and drive system 82 allow patient support apparatus 220 to be driven and steered autonomously from one location to another without the need for a user to carry out this steering and speed control, and indeed without the need for a user to even be present. In at least one embodiment, patient support apparatus 220 includes within user interface 44 one or more buttons 46—or other controls—that enable a user to input the desired destination for patient support apparatus 220 and to input a command that then commands patient support apparatus 220 to travel autonomously to the desired destination. Navigation and guidance system 84 is also configured to receive desired destinations from mobile electronic devices 64b and/or from remote computers 64c. Such devices transmit their commands through server 64a to off-board communication module 56. When patient support apparatus 220 receives a desired destination from a remote device 64, it transmits periodic updates of its location back to remote device 64 while traveling to the desired destination. Patient support apparatus 220 also transmits a message back to remote device 64 when it arrives at the desired destination.

Figure 6:
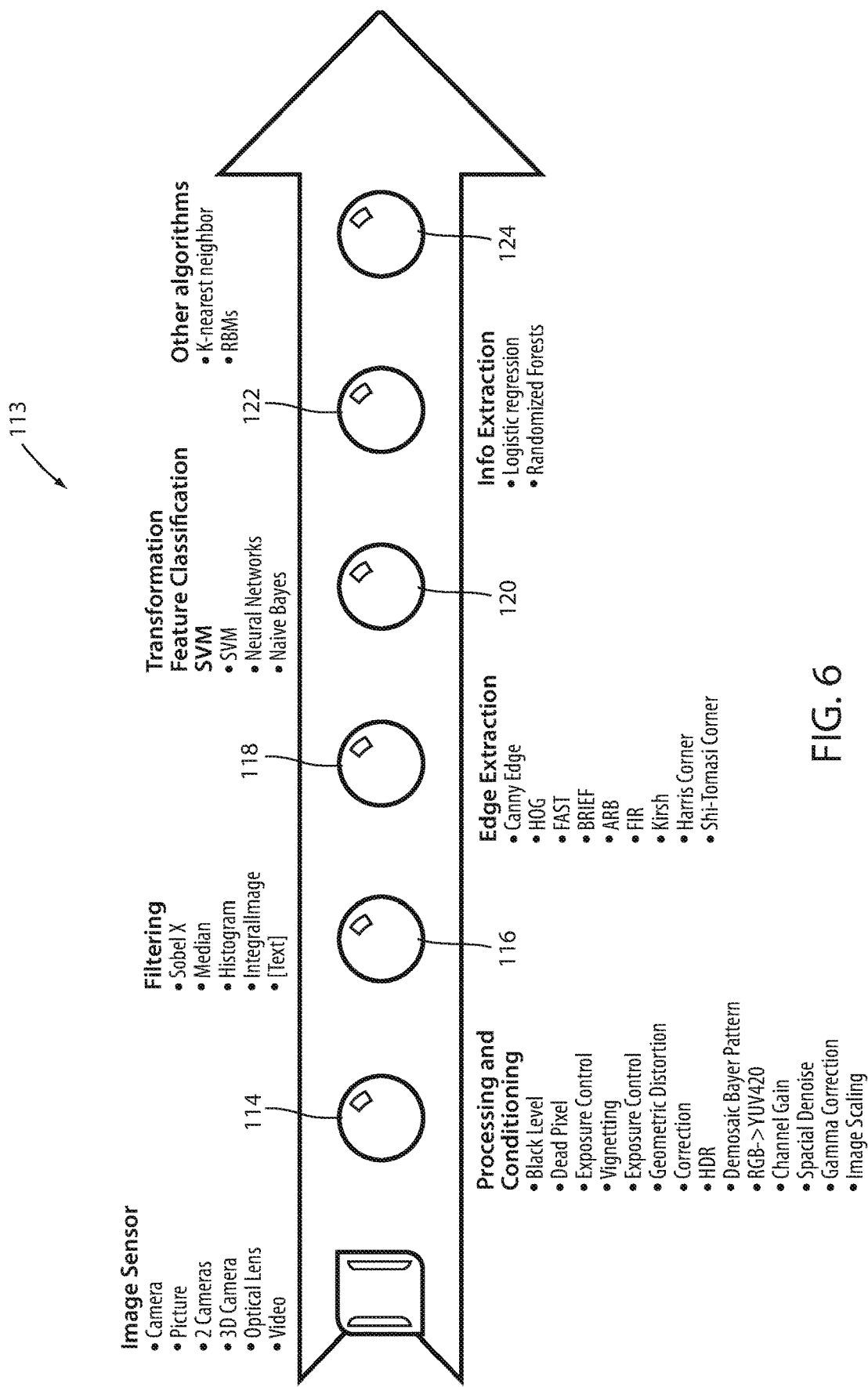
FIG. 6 is a process diagram illustrating a plurality of processing steps that are carried out by the landmark/object detection system of FIG. 5.

FIG. 6 illustrates in more detail a process 113 that is undertaken by processor 92 (which may include one or more coprocessors, graphics processors, and/or other processing circuitry). As shown therein, at a first step 114, processor 92 of object/landmark detection system 80 processes and conditions the images captured by image sensors 91. Thereafter, the processed images undergo one or more filtering techniques at step 116. After the filtering is performed, processor 92 performs at a step 118 one or more edge extraction techniques on the processed and filtered image data. After performing the edge extraction, processor 92 transforms and/or classifies features in the processed image data at a step 120. Finally, at steps 122 and 124, information indicating which pixels of the image data correspond to objects 88 and/or landmarks 90 is extracted from the image data and the identification and position determining functions mentioned above are carried out with respect those objects 88 and/or landmarks 90.

When initially processing the image data captured by image sensors 91 at step 114, processor 92 performs one or more of the following processes using algorithms stored in algorithm library 98: black level detection and adjustments, dead pixel detection, exposure detection and adjustments, vignetting detection and adjustments, geometric distortion detection and correction, high dynamic range rendering, demosaicing, RGB (red, green, blue) to YUV color space conversions, spatial denoising (including salt and pepper noise and Gaussian noise), gamma correction, and image scaling.

After performing one or more of the aforementioned processes at step 114, processor 92 applies one or more filters to the image data at step 116. Such filters include the Sobel filter or operator, the median filter, a histogram median filter, an integral image filter (or summed area table filter), a finite impulse response (FIR) filter, and a text filter.

Figure 7B:
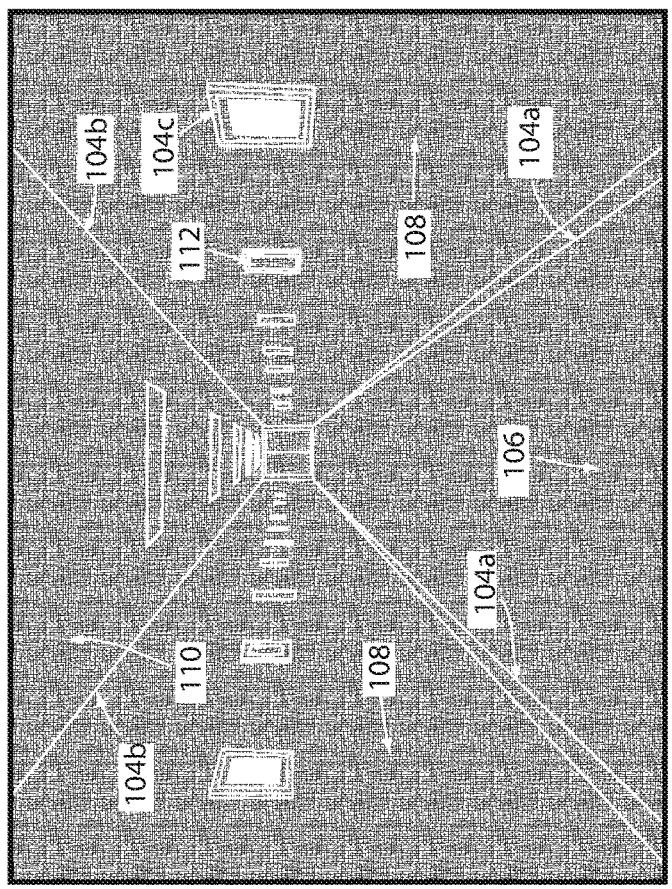
FIG. 7B is a diagram corresponding to the image of FIG. 7A after having been processed by one or more edge detection algorithms.
Figure 7A:
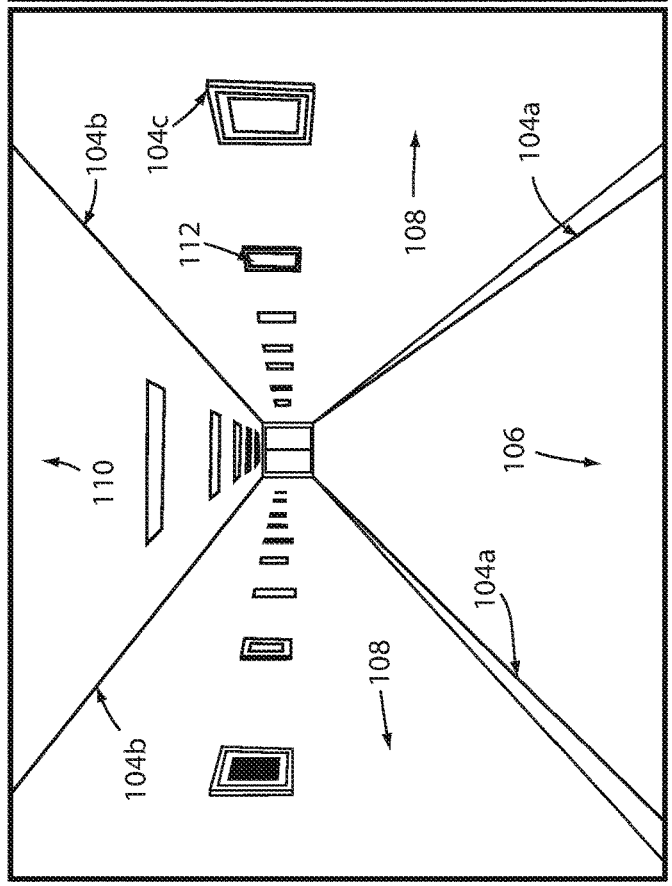
FIG. 7A is an illustrative image of a hallway that may be captured by an image sensor of the landmark/object detection system of FIG. 5.

Following the filtering step at 116, processor 92 proceeds to step 118 where it applies one or more of the following edge extraction techniques: Canny edge detection, Histogram of Oriented Gradients (HOG) processing, Features from Accelerated Segment Test (FAST) processing, Binary Robust Independent Elementary Feature (BRIEF) or other binary descriptor processing, Kirsh operator edge detection, the Harris affine region detector, and the Shi-Tomasi corner detection algorithm. FIG. 7A illustrate an arbitrary image captured of a hallway, such as might be present in a healthcare facility, prior to processing by processor 92. FIG. 7B illustrates the image of FIG. 7A after one or more edge detection techniques have been applied. As can be seen therein, first edges 104a between a floor 106 and walls 108 are more easily identified in FIG. 7B, as well as second edges 104 between walls 108 and ceiling 110. The edge detection algorithms applied to FIG. 7B also accentuate the edges 104c of a plurality of pictures 112 hanging on walls 108. In some embodiments, pictures 112 may serve as landmarks 90 with landmark library 96 storing identifying information for each picture 112, including its location within the healthcare facility.

After performing one or more edge detection techniques on the image data at step 118, processor 92 is also programmed to analyze the image data at step 120 by using one or more of the following machine learning techniques: creating and using a Support Vector Machine (SVM) or support vector network model, creating and using an artificial neural network model, and/or applying naive Bayes classifiers to the processed image data. Processor 92 may also be programmed to extract information from the image data using logistic regression and/or randomized forest methods at step 122. Finally, processor 92 may also be programmed to carry out K-nearest neighbor processing for classifying the image data and/or restricted Boltzmann machine (RBM) processing of the image data at step 124.

Figure 8:
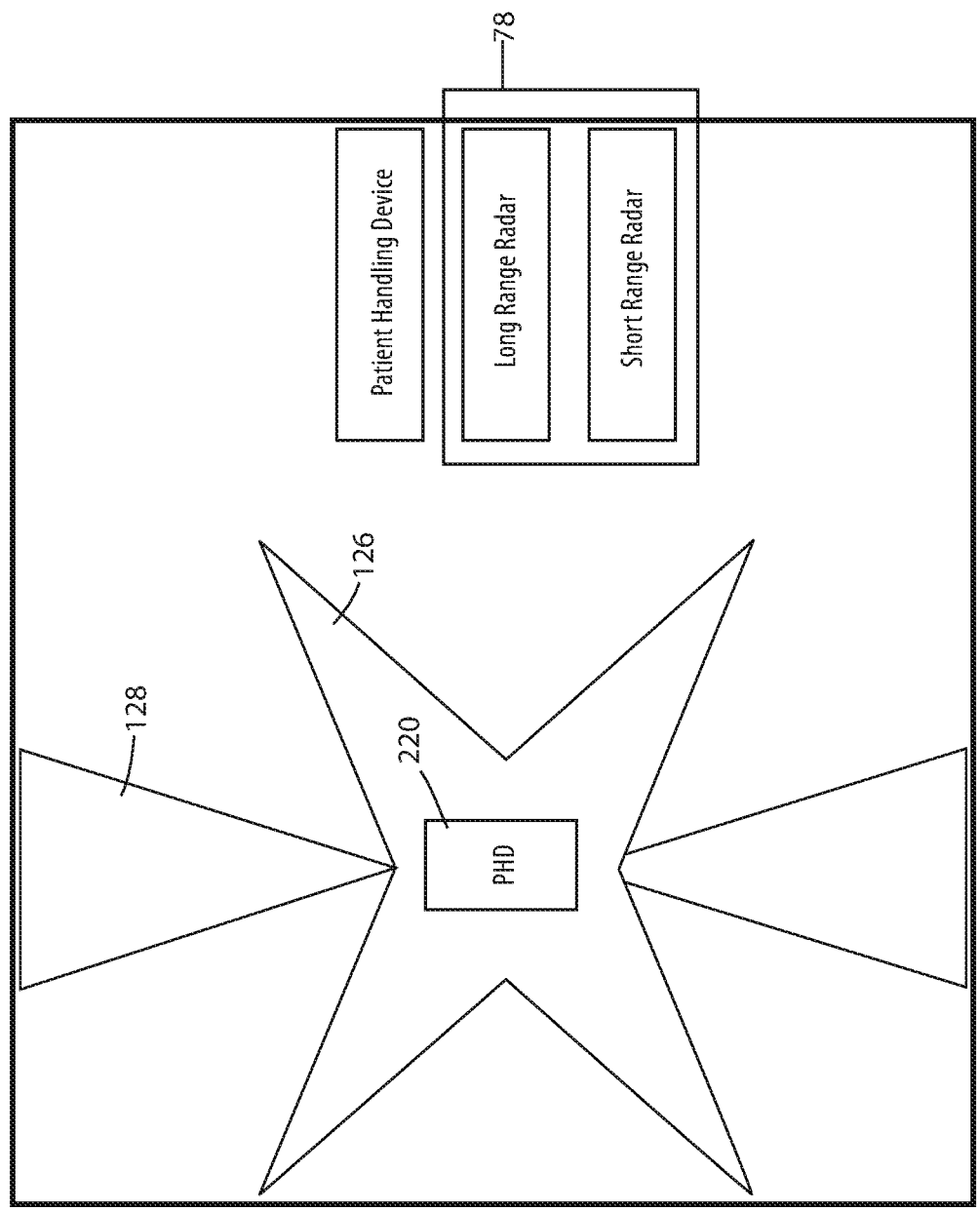
FIG. 8 is a block diagram of a first ranging subsystem that is usable with the patient support apparatus of FIG. 4.

FIG. 8 illustrates in greater detail one manner in which ranging subsystem 78 may be implemented on patient support apparatus 220. More specifically, ranging subsystem 78 of FIG. 8 includes both short range radar and long range radar. As can be seen, the short range radar detects objects within a short area 126 while the long range radar detects objects within a large area 128. The signals emitted by the short and long range radars that are reflected off of objects are detected by sensors on board patient support apparatus 220 and processed by ranging subsystem 78 to determine the distance and shape of objects. Processor 92 correlates the distance and shape information received from ranging subsystem 78 with the images captured by image sensors 91. This is accomplished in known manners and includes time stamping the images captured by image sensors 91, time stamping the ranging information received from ranging subsystem 78, and knowing the relative position and angles between the images sensors 91 and the radar sensors on board patient support apparatus 20.

Figure 9:
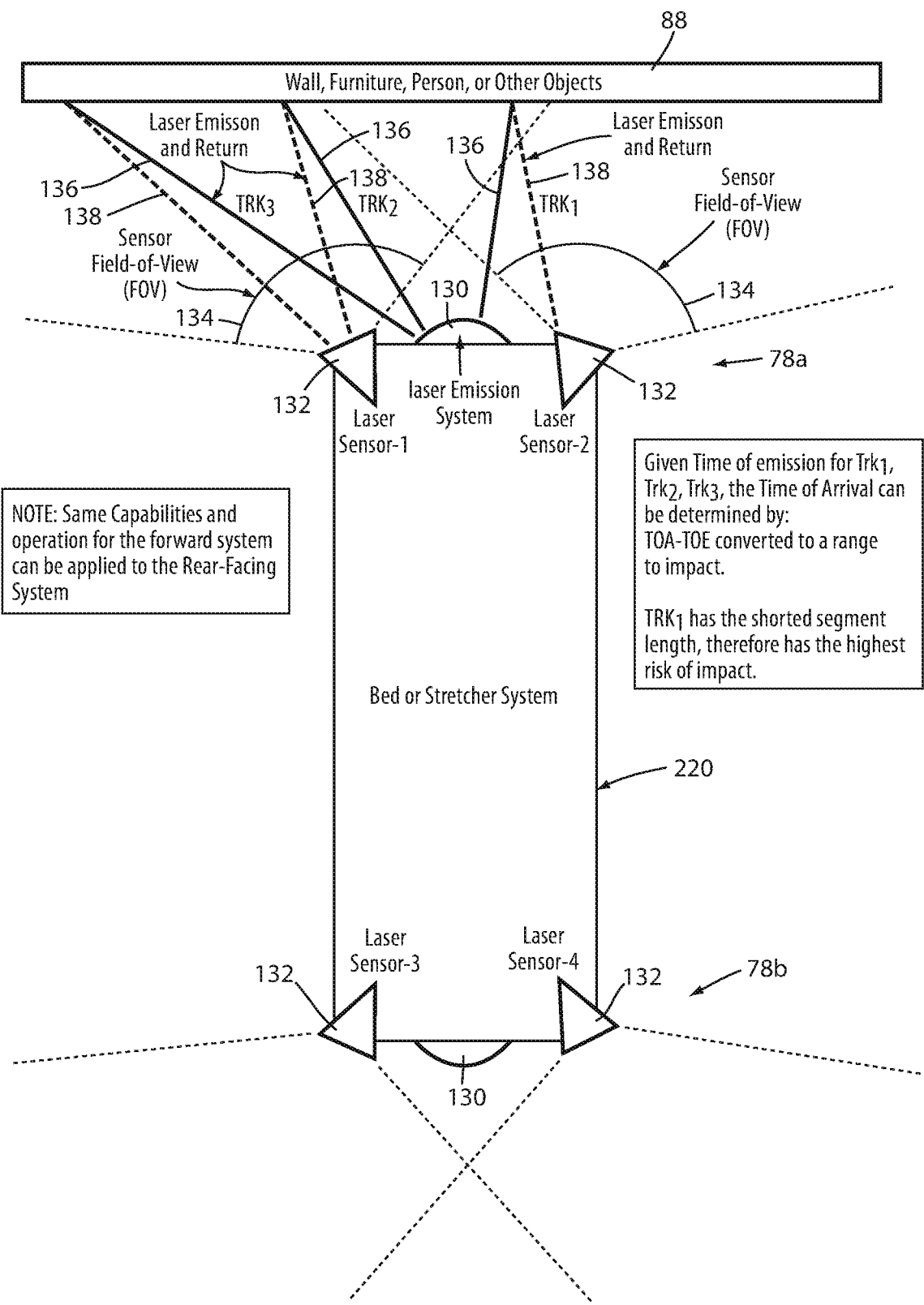
FIG. 9 is a block diagram of a second ranging subsystem that is usable with the patient support apparatus of FIG. 4.

FIG. 9 illustrates a patient support apparatus 220 having an alternative ranging subsystem 78a that may be used instead of subsystem 78. In the embodiment shown in FIG. 9, patient support apparatus 220 includes a first ranging subsystem 78a positioned at the head end of patient support apparatus 220 and a second ranging subsystem 78a positioned at the foot end of patient support apparatus 220. The following description of ranging subsystem 78a applies to both the head end and foot end subsystems 78a.

Ranging subsystem 78a utilizes on-board laser emitters and sensors to detect the distances, shapes, and relative locations of the objects and landmarks 88 and 90 with respect to patient support apparatus 220. That is, processor 92 processes the reflections of the laser beams to determine the location, shape, and dimensions of any objects 88 and/or landmarks 90 that are within the field of view of the laser emitters. Each ranging subsystem 78a includes at least one laser emitter 130 and one or more laser sensors 132. Each laser sensor 132 includes a sensor field of view 134. Laser emitters 130 emit laser beams having outgoing tracks 136 and, when encountering an object 88, return tracks 138. Ranging subsystem 78a determines a distance to the object 88 by subtracting the time of emission of an outgoing laser track 136 from the time of arrival of the reflected or returning laser track 138. This time differential is converted to an estimate of distance based upon the known speed of light.

Laser emitters 130 are configured to emit outgoing tracks 136 at different angles so that objects 88 positioned at any location near the forward or rearward ends of patient support apparatus 220 can be detected. The distance and location information detected by ranging subsystem 78 of objects 88 or landmarks 90 is utilized by processor 92 to correlate with pixel data from the images from image sensors 91 to determine the distance and locations of objects within the pixel data. In other words, processor 92 identifies objects and landmarks 90 using image data from image sensors 91, and determines the distance and location of those objects relative to patient support apparatus 220 using the ranging information gathered from ranging subsystem 78a.

Processor 92 also utilizes and compares successive ranging measurements and/or successive captured images to determine the relative speed of the detected objects 88 or landmarks 90 with respect to patient support apparatus 220 is determined by processor 92. As described previously, knowing the relative speed and direction of the detected objects 88 or landmarks 90 with respect to patient support apparatus 220, along with the dimensions of the objects 88, landmarks 90, and patient support apparatus 220, navigation and guidance system 84 determines what actions, if any, to take to reduce the risk of a collision.

In at least one embodiment, pulse repetition frequencies are used with the emitted laser beams in order to allow for tracking of each laser beam and for easy discrimination between signals. The laser emitters 130 emit laser beams in an arc pattern at both the front and rear ends of patient support apparatus 220. System 80 discriminates between the detected backscatter and other reflections via amplitude and pulse time of arrival differences. The software executed by processor 92 also allows for organization and discrimination between valid tracked objects and backscatter and reflections. With data from the navigation subsystem of the navigation and guidance system 84, navigation and guidance system 84 is able to determine an estimated time of impact with the detected object (assuming no changes are made to the movement of patient support apparatus 220 through motion commands to drive system 82). Navigation and guidance system 84 uses this information to determine what motion commands to send to drive system 82 in order to reduce or eliminate the likelihood of a collision with the object 88 (or landmark 90).

Figure 10:
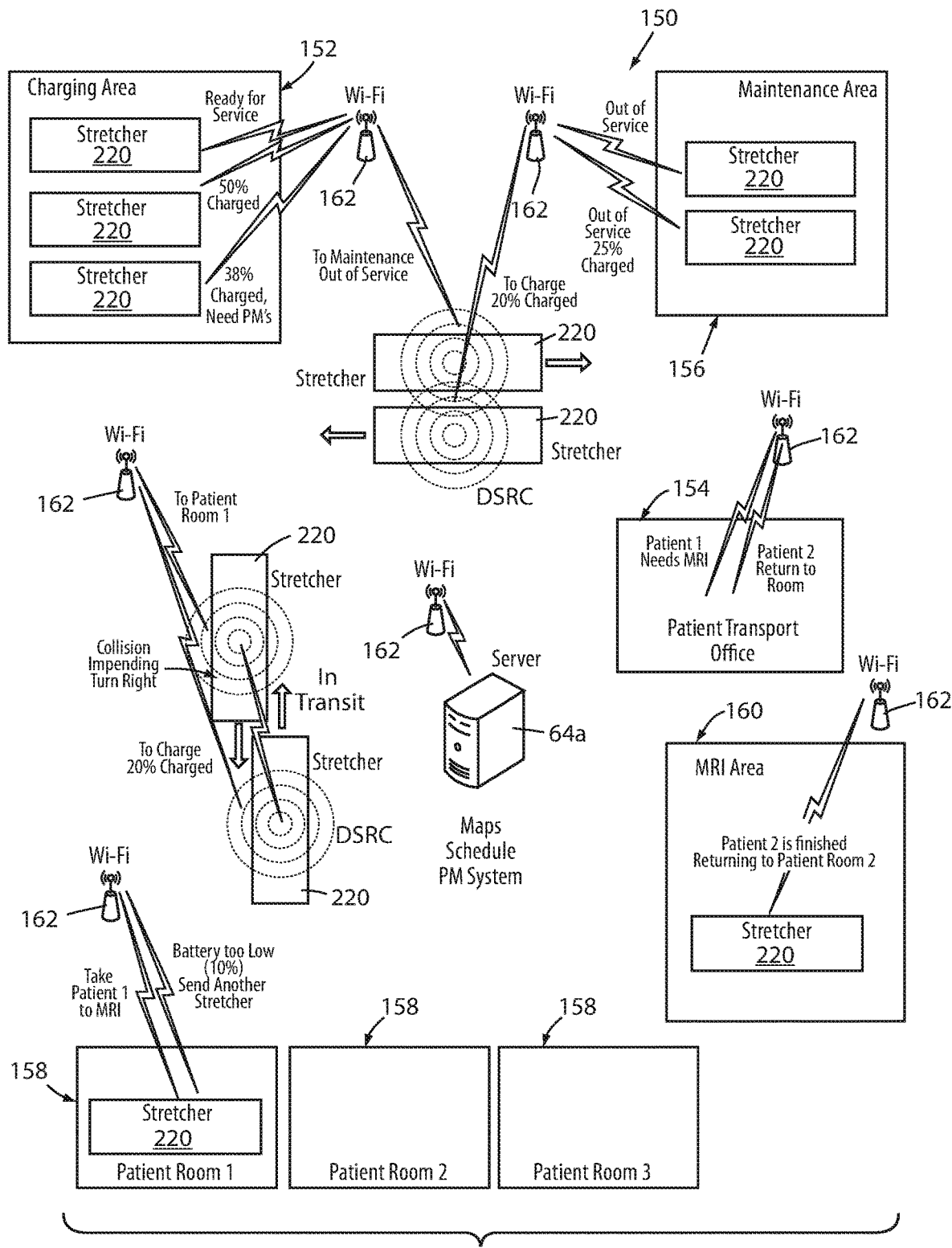
FIG. 10 is a diagram of a patient support apparatus system according to another embodiment of the disclosure.

FIG. 10 illustrates in greater detail one embodiment of a patient support apparatus system 150 that may be utilized in a healthcare facility. Patient support apparatus system 150 includes a plurality of patient support apparatuses. For purposes of visual and descriptive convenience, the patient support apparatuses of FIG. 10 have all been labeled with the reference number 220 and are referenced herein with the reference number 220. It will be understood, however, that some or all of the patient support apparatuses of FIG. 10 could alternatively be implemented as patient support apparatuses that are different from the patient support apparatuses 220 described previously.

As is often the case in many healthcare facilities, the healthcare facility itself includes one or more charging areas 152 where the batteries of the patient support apparatuses 220 are charged. Typical healthcare facilities may also include one or more transport offices 154, maintenance areas 156, patient rooms 158, and MRI areas 160, as well as still other types of areas not shown in the illustrative example of FIG. 10. Typical healthcare facilities also include a healthcare computer network (not shown), such as, but not limited to, one or more Ethernets. Further, the healthcare computer network often includes a plurality of wireless access points 162 that enable mobiles devices—including patient support apparatuses 220—to communicate with the healthcare computer network using WiFi and/or other wireless communication protocols. System 150 also includes a remote device, such as server 64a, that is in communication with the healthcare facility network. Patient support apparatuses 220 are able to communicate with server 64a, and vice versa, via the healthcare computer network, the wireless access points 162, and the wireless off-board communication modules 56 included with each patient support apparatus 220.

Patient support apparatus system 150 is designed to provide valet functionality to caregivers and other personnel of the healthcare facility with respect to the patient support apparatuses 220. System 150 therefore allows authorized personnel to summon a patient support apparatus 220 to a desired location utilizing server 64a directly, or more typically, utilizing a device that is in communication with server 64a, such as a mobile electronic device 64b and/or a computer 64c that is part of the healthcare facility network. System 150 includes all of the functionality previously described regarding summoning patient support apparatuses, identifying available patient support apparatuses (including the nearest one), estimating times of arrival, and showing locations of the patient support apparatuses on maps.

In a first embodiment of system 150, the summoning of patient support apparatuses 220 takes place via initial communication with patient transport office 154. That is, in this first embodiment, the need for a patient support apparatus 220 is first communicated to office 154. This communication may occur via a telephone call to a person working in office 154, or via an electronic transmission to a computer positioned in office 154 that the person has access to (e.g. an email, text, instant message, or still other means). However communicated, the person in office 154 responds to the request for a patient support apparatus 220 by utilizing a software program on the computer in office 154 that is in communication with server 64a (the software program, in at least one embodiment, is staff application software 76). The software enables the person in office 154 to inquire about currently available patient support apparatuses 220 that can be directed to the desired location. Server 64a responds to this request with a list of patient support apparatuses 220 that are currently available for satisfying the request for a patient support apparatus. The person in office 154 then chooses one of the patient support apparatuses 220 from the list, and sends an instruction to server 64a instructing it to command the chosen patient support apparatus 220 to drive itself to the requested location. In this first embodiment, the selection of patient support apparatuses is facilitated by server 64a, but the person or persons in transport office 154 ultimately choose how to respond to the incoming requests for patient support apparatuses 220.

In a second embodiment of system 150, the summoning of patient support apparatuses 220 occurs automatically without the need for any manual action by a person in office 154. In this embodiment, a person desiring a patient support apparatus 220 makes a request for a patient support apparatus 220 using his or her mobile electronic device 64b or a nearby computer 64c. The request is then forwarded directly to server 64a, which determines which patient support apparatuses are available for transport, selects one, and commands the selected one to move to the requested location.

In either the first or second embodiments, after a patient support apparatus 220 has responded to a request, and after the patient support apparatus 220 has finished transporting a patient to a desired location, system 150 is adapted to automatically command the patient support apparatus 220 to travel to a cleaning area, such as maintenance area 156. To the extent the battery on board the patient support apparatus 220 has drained below a threshold charge level, server 64a also automatically commands the patient support apparatus 220 to travel to one of the charging areas 152 to have its battery recharged.

In some embodiments, when server 64a transmits a command to a particular patient support apparatus 220 to travel to a desired destination, server 64a merely identifies the desired destination to the patient support apparatus 220 and the patient support apparatus 220 consults its own on-board map of the healthcare facility to determine a route to the commanded destination. The on-board map is stored in a memory of patient support apparatus 220 that is accessible to navigation and guidance system 84. Patient support apparatus 220 then follows the chosen route using object/landmark detection system 80 to avoid obstacles and to periodically detect its location within the healthcare facility as previously described.

In other embodiments, server 64a determines the route by which patient support apparatus 220 is to travel to the desired destination and transmits this route to patient support apparatus 220. This transmission may occur all at once, or it may be sent piecemeal (such as by sending commands to patient support apparatus 220 to travel to a first waypoint, and then to a second waypoint, and then to a third, and so on, until the patient support apparatus 220 reaches the desired destination). Still other manners for commanding and controlling the routing of patient support apparatuses 220 are possible.

In some embodiments of patient support apparatus system 150, patient support apparatuses 220 are equipped with dedicated short range communication (DSRC) equipment that enables them to talk directly to each other in a manner that helps avoid collisions between patient support apparatuses. DSRC is primarily designed for use with automobiles and operates in the United States over a 75 MHz spectrum in the 5.9 GHz band (it occupies a 30 MHz spectrum of the 5.9 GHz band in Europe). Among the applications of DSRC that may be applied to patient support apparatuses 220 are the following: emergency warning systems for patient support apparatuses, cooperative adaptive cruise control, cooperative forward collision warnings, intersection collision avoidance, and any other forms of collision avoidance.

It will be understood by those skilled in the art that various modifications and changes to the patient support apparatuses and patient support apparatus systems disclosed herein can be made. For example, navigation system 60 can be incorporated into other devices, such as recliners and/or thermal control systems. One such suitable recliner is disclosed in commonly assigned U.S. patent application Ser. No. 14/212,253 filed Mar. 14, 2014 by inventors Christopher Hough et al. and entitled MEDICAL SUPPORT APPARATUS, the complete disclosure of which is incorporated herein by reference. One such thermal control system is disclosed the previously mentioned patent application Ser. No. 14/282,383, which has already been incorporated herein by reference. When navigation system 60 is incorporated into recliners and/or thermal control systems (and/or beds, stretchers, cots, or the like), the navigation system 60 communicates with a remote device, such as server 64a, which monitors, logs, and keeps track of the locations of each of the devices having a navigation system 60 on-board.

It will also be understood that, when one or more patient support apparatuses 20 are implemented as beds, the beds may take on a wide variety of forms. In some embodiments, when the patient support apparatuses are implemented as beds, they are constructed in any of the manners described in commonly assigned, U.S. Pat. No. 8,689,376 issued Apr. 8, 2014 by inventors David Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, and/or any of the manners described in commonly assigned, U.S. patent application Ser. No. 13/775,285 filed Feb. 25, 2013 by inventors Guy Lemire et al. and entitled HOSPITAL BED, the complete disclosures of both of which are hereby incorporated herein by reference.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus system comprising:
a server adapted to communicate alerts to mobile electronic devices carried by personnel; and
a patient support apparatus comprising:
a frame;
a plurality of wheels;
a support surface supported by the frame and adapted to support a patient thereon;
a patient presence detector adapted to detect whether or not a patient is present on the support surface;
a wireless transceiver for communicating with the server;
a drive subsystem adapted to operate in an autonomous mode and a manual mode, the patient support apparatus being driven and steered autonomously when in the autonomous mode, and the patient support apparatus being at least steered manually when in the manual mode; and
a control system in communication with the patient presence detector, the drive subsystem, and the wireless transceiver, the control system adapted to transmit to the server a message indicating whether or not the patient is currently present on the support surface or not.

2. The patient support apparatus system of claim 1 wherein the control system is adapted to automatically prevent the drive subsystem from operating in the autonomous mode when the patient presence detector indicates that the patient is currently present on the support surface.

3. The patient support apparatus system of claim 2 wherein the patient support apparatus is a stretcher.

4. The patient support apparatus system of claim 1 wherein the control system is further adapted to receive data from an Admission, Discharge, and Tracking server in communication with the server, the data being forwarded by the server to the patient support apparatus via the wireless transceiver and the data indicating whether or not any patient is currently associated with the patient support apparatus or not.

5. The patient support apparatus system of claim 4 wherein the control system is adapted to automatically prevent the drive subsystem from operating in the autonomous mode when the patient presence detector indicates that the patient is currently present on the support surface, or when the data indicates that the patient is currently associated with the patient support apparatus.

6. The patient support apparatus system of claim 5 further including an image sensor adapted to capture images of an area within a field of view of the image sensor; and
wherein the drive subsystem—when in the autonomous mode—is adapted to analyze the images to detect landmarks within a healthcare facility and to utilize the detected landmarks to autonomously drive the patient support apparatus to a destination within the healthcare facility.

7. The patient support apparatus system of claim 6 further including a bumper adapted to detect contact between the patient support apparatus and an object and to provide an indication to the control system when such contact is detected, the control system adapted to reduce a speed of the patient support apparatus when such contact is detected regardless of what images are detected by the image sensor.

8. The patient support apparatus system of claim 6 further including:
an orientation sensor adapted to determine an orientation of the patient support apparatus within a frame of reference;
a speed sensor adapted to determine a speed of the patient support apparatus; and
a memory having reference data sufficient to correlate the frame of reference with the healthcare facility.

9. The patient support apparatus system of claim 1 wherein the patient presence detector includes a plurality of load cells positioned at locations on the patient support apparatus where the load cells detect a weight of the patient when the patient is positioned on the support surface.

10. The patient support apparatus system of claim 1 wherein the patient support apparatus is adapted to receive a summons from the server via the wireless transceiver to drive to a selected location, and the drive subsystem is adapted to drive the patient support apparatus to the selected location in the autonomous mode if the patient is currently not present on the support surface.

11. A patient support apparatus system comprising:
a server adapted to communicate alerts to mobile electronic devices carried by personnel; and
a patient support apparatus comprising:
a frame;
a plurality of wheels;
a support surface supported by the frame and adapted to support a patient thereon;
a plurality of siderails adapted to be moved between raised and lowered positions;
a wireless transceiver for communicating with the server;
a drive subsystem adapted to drive at least one of the plurality of wheels;
an odometer adapted to detect a distance the patient support apparatus has traveled; and
a control system in communication with the odometer, the drive subsystem, and the wireless transceiver, the control system adapted to transmit to the server a message indicating the distance the patient support apparatus has traveled, and wherein the server is adapted to communicate a maintenance alert to at least one of the mobile electronic devices if the distance the patient support apparatus has traveled exceeds a threshold.

12. The patient support apparatus system of claim 11 wherein the server is further adapted to transmit the maintenance alert to the patient support apparatus, and the patient support apparatus is further adapted to provide a visual indication of the maintenance alert.

13. The patient support apparatus system of claim 11 wherein the patient support apparatus further includes a battery and the control system is adapted to transmit to the server a charge status indicating a current charge state of the battery.

14. The patient support apparatus system of claim 13 wherein the server is further adapted to communicate a battery alert to at least one of the mobile electronic devices if the charge status is below a charge threshold.

15. The patient support apparatus system of claim 14 wherein the server is further adapted to determine a location of the patient support apparatus and to communicate the location with the battery alert to the at least one of the mobile electronic devices.

16. The patient support apparatus system of claim 13 wherein the server is further adapted to determine if the patient support apparatus is a nearest one of a plurality of patient support apparatuses to a current location of a particular one of the personnel and to report a location of the patient support apparatus to the particular one of the personnel if the patient support apparatus is the nearest one of the plurality of patient support apparatuses.

17. The patient support apparatus system of claim 16 wherein the server is adapted to determine that the patient support apparatus is not the nearest one of the plurality of patient support apparatuses to the current location of the particular one of the personnel if the charge status of the battery is below a charge threshold.

18. The patient support apparatus system of claim 16 wherein the server is adapted to determine that the patient support apparatus is not the nearest one of the plurality of patient support apparatuses to the current location of the particular one of the personnel if the distance the patient support apparatus has traveled exceeds the threshold.

19. The patient support apparatus system of claim 11 wherein the patient support apparatus includes a user input adapted to allow a person to input information indicating that maintenance work has been performed on the patient support apparatus, and wherein the control system is adapted to reset the threshold in response to the input information.

20. The patient support apparatus system of claim 11 wherein the mobile electronic devices include cell phones.

\* \* \* \* \*